Figure 2:
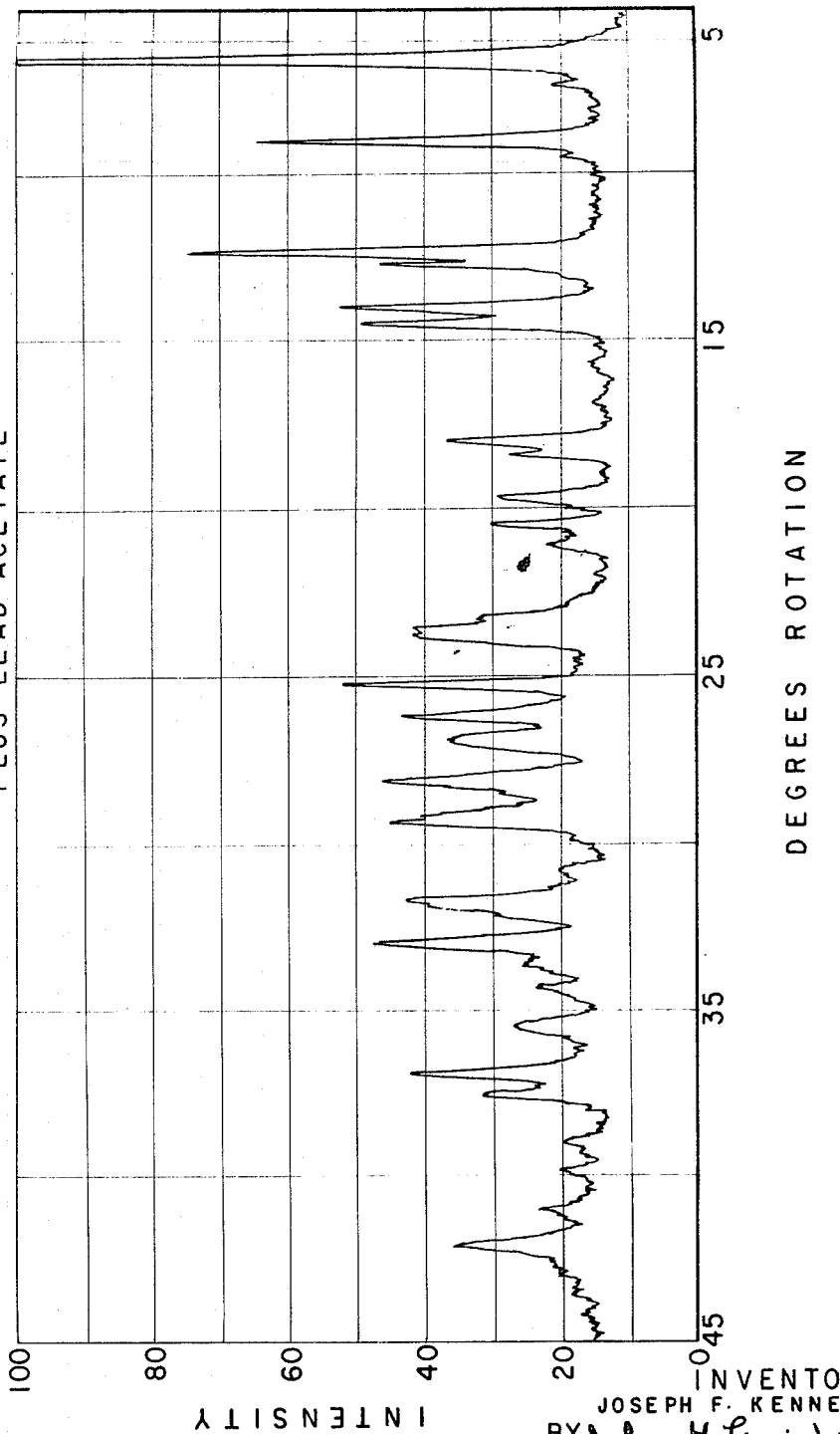

Fig. 2 — Mechanical mixture of normal lead picrate plus lead hydroxide plus lead nitrate plus lead acetate Dec. 20, 1966   J. F. KENNEY   3,293,091
COMPLEX SALTS OF BASIC LEAD PICRATE
Filed Jan. 22, 1964   16 Sheets-Sheet 11

INVENTOR
JOSEPH F. KENNEY
BY
ATTORNEYS

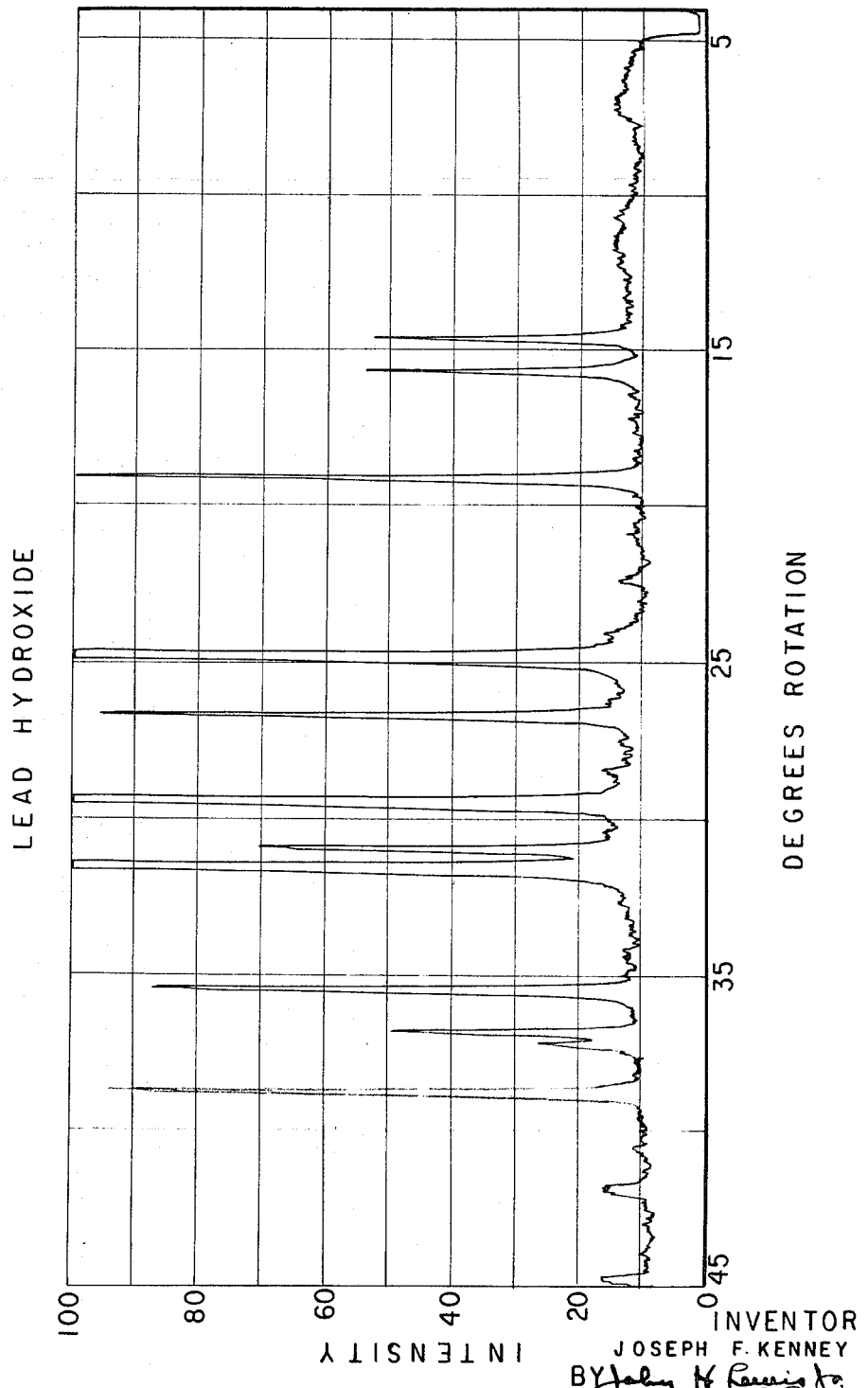
Fig. 13 — Lead Hydroxide

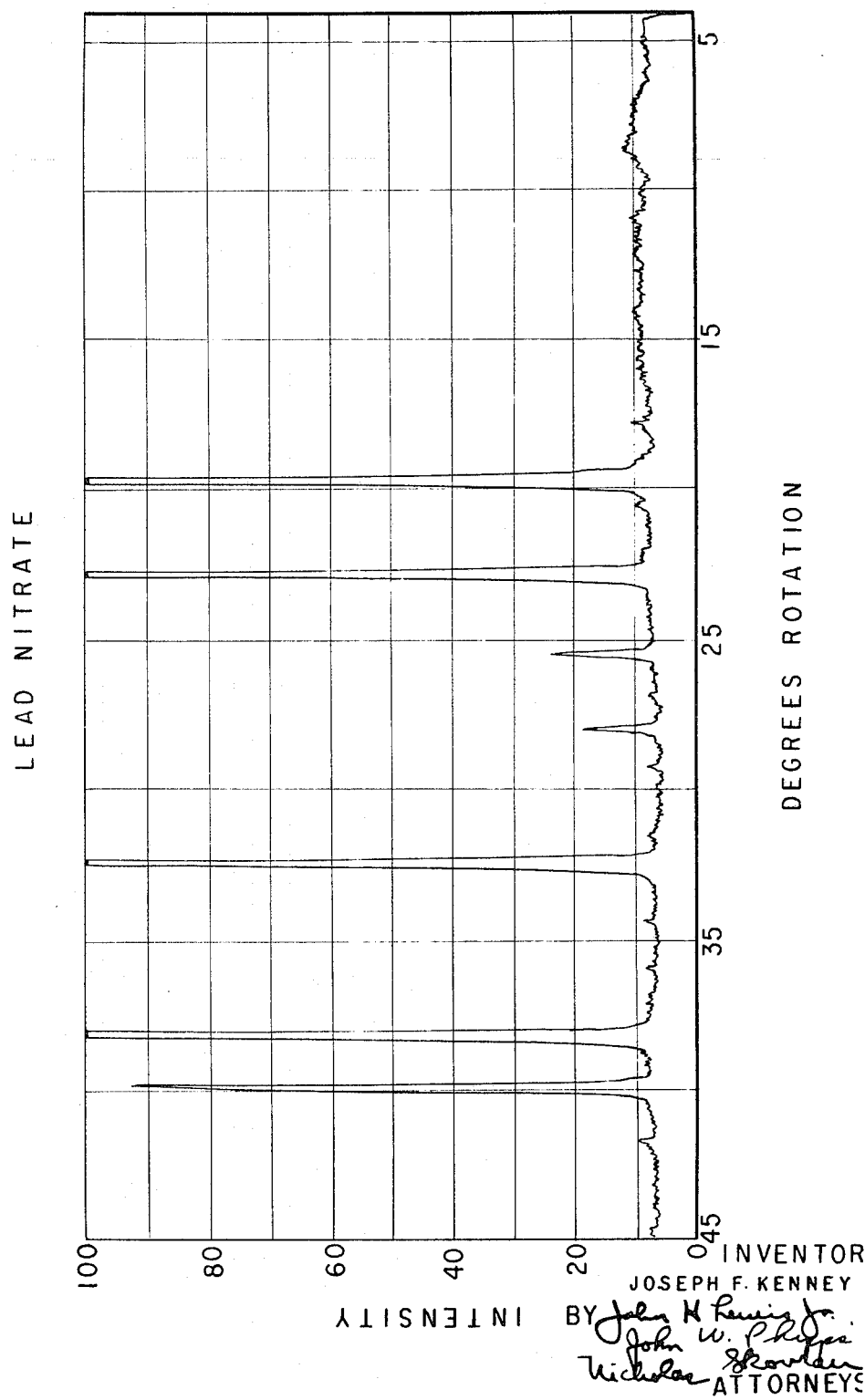

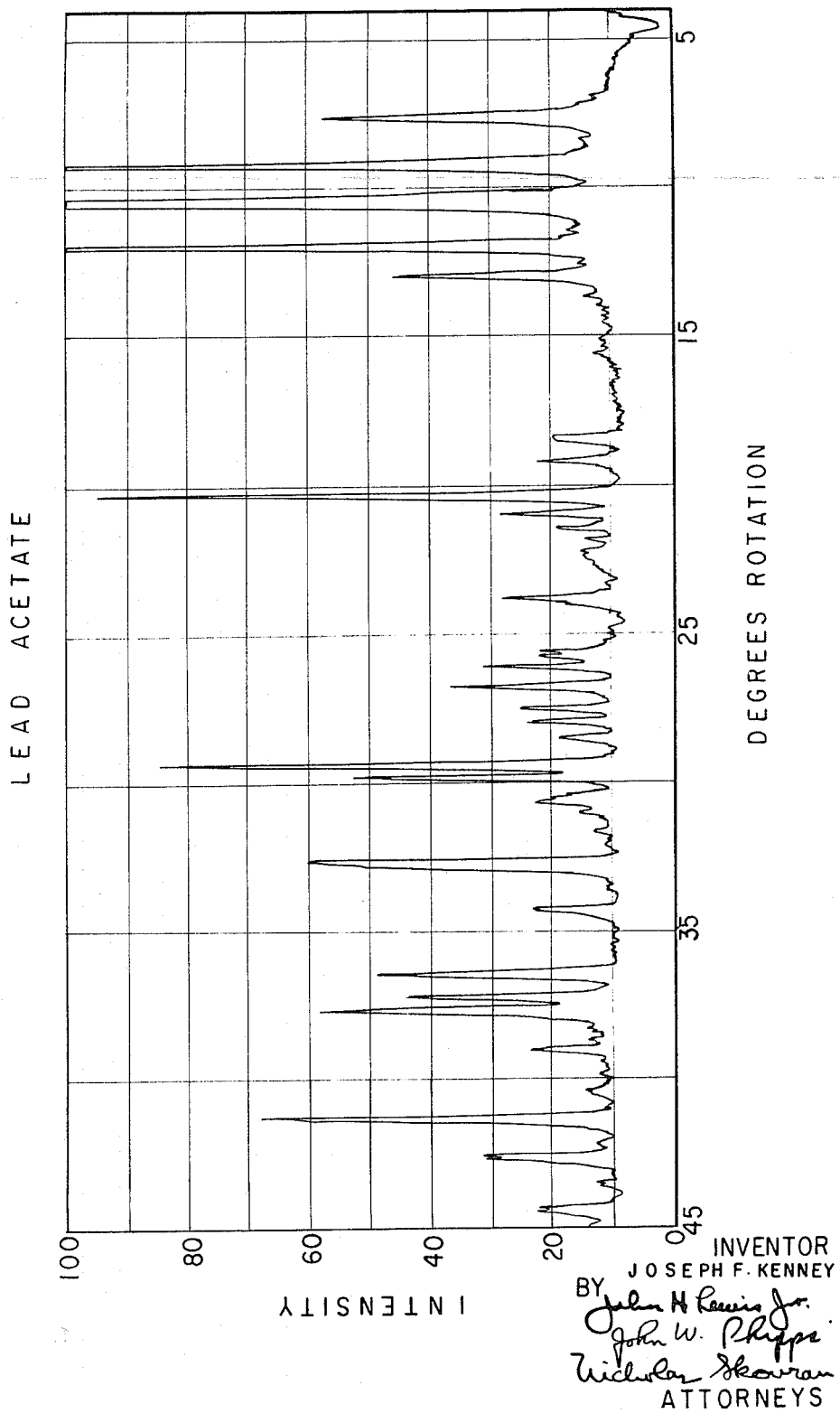

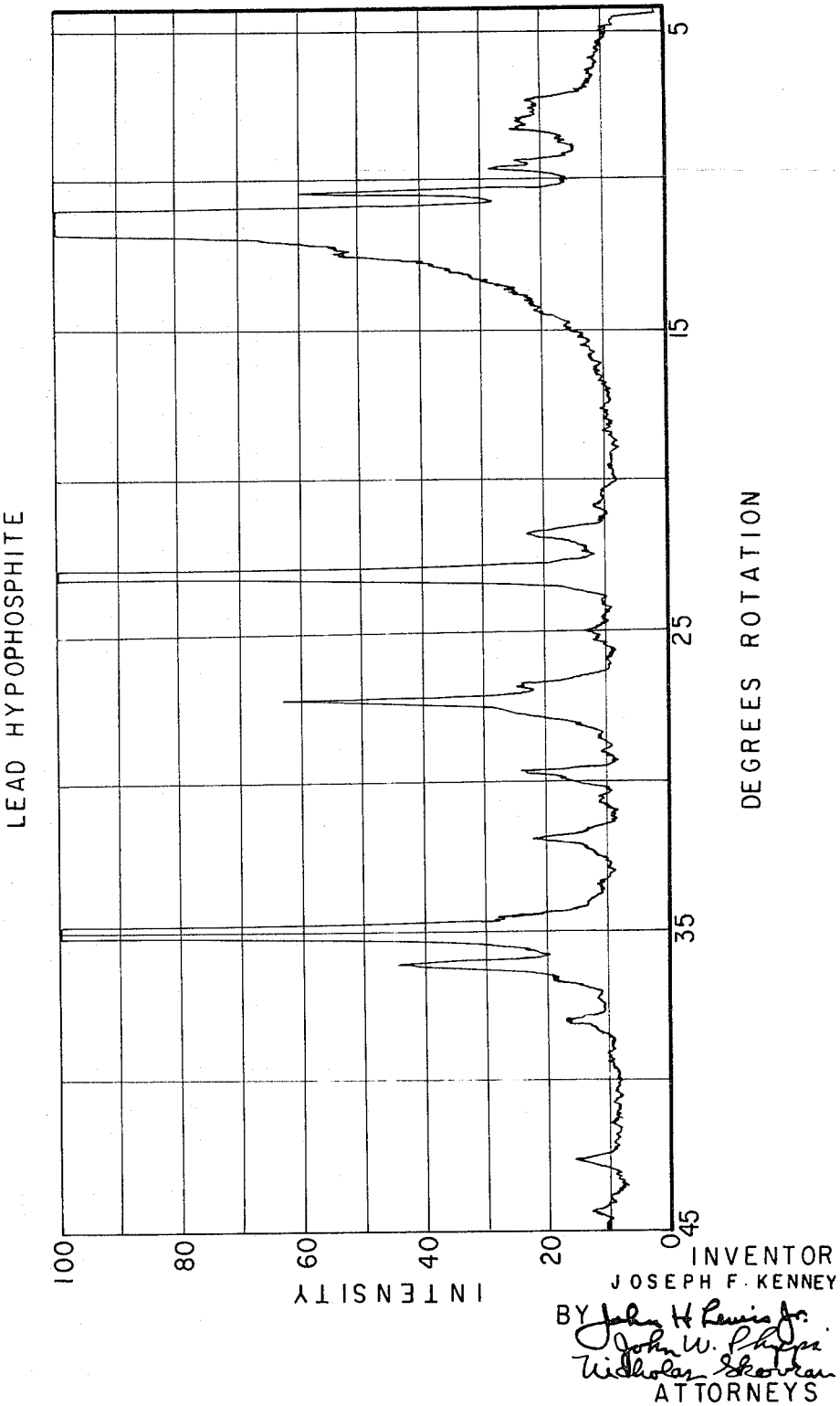

United States Patent Office 3,293,091
Patented Dec. 20, 1966

3,293,091
COMPLEX SALTS OF BASIC LEAD PICRATE
Joseph F. Kenney, Bridgeport, Conn., assignor to Remington Arms Company, Inc., Bridgeport, Conn., a corporation of Delaware
Filed Jan. 22, 1964, Ser. No. 339,474
57 Claims. (Cl. 149—24)

This application is a continuation-in-part of both my pending applications Ser. No. 190,237, entitled Explosive Composition, filed Apr. 26, 1962, now abandoned, and Ser. No. 190,238, entitled Explosive Composition, also filed Apr. 26, 1962, now abandoned.

This invention relates to a new series of primary explosive compounds, a method of producing such compounds, and to compositions containing such compounds, which are useful in primers for ammunition, fuzes, blasting caps, squibs, and electric match heads.

The primary objectives of the invention are the production of explosives which are safer to handle, and less expensive to produce, while maintaining sensitivity and explosive strength ample for use in substitution for such explosives as normal lead styphnate.

Conventional explosive compositions for use in primers and fuzes frequently comprise three classes of ingredients in mechanical mixture:

First, an explosive or percussion or flame sensitive ingredient which in response to fire, heat, detonation, or to the blow of a firing pin or friction creating member breaks down with the creation of heat and pressure adequate to initiate and sustain an explosive reaction;

Second, a fuel or substance to be burned with the production of a flame of sufficient heat and intensity to effectively ignite a propellant powder or another explosive ingredient in a detonating train;

Third, an oxidizer comprising a chemical compound capable of being broken down to release oxygen to aid in the combustion of the fuel.

Such compositions may for some applications be supplemented by the use of a fourth ingredient usually referred to as a sensitizer which may not itself be necessarily particularly sensitive to percussion but which in combination with the other explosive makes the mixture adequately sensitive but not unduly violent in exploding. Some sensitizers also improve the uniformity with which compositions respond to percussive effects. For certain applications, the explosives of this invention, preferably are used in combination with a sensitizer, such as 1-guanyl-4-nitrosoaminoguanyltetrazene, also known as tetrazene or tetracene, but for many other purposes such sensitizers are not required. Since the explosives of this invention are not completely self-sufficient in oxygen, maximum efficiency requires the use of extra oxidizer such as barium nitrate.

It has been known for some time that certain compounds can be precipitated as complex compounds in the form of double, triple or higher salts of definite chemical composition and usually of definite crystal structure having unique properties all unlike those of the individual salts or mechanical mixtures thereof. Such complex salts are true compounds, as distinct from mechanical mixtures of the several salts. Many are believed to be types of inclusion compounds, now generally recognized as "clathrate compounds." Referring to the literature, "Clathrate Inclusion Compounds," Sister Martinette Hagan, Reinhold Publishing Corporation, New York, Copyright 1962, includes, in the Preface, the following statement:

"Clathrates are complex compounds composed of two or more components. They differ from other complex compounds in that the molecules of their components are associated without ordinary chemical bonding. In each case there is complete enclosure of the molecules of one component in a suitable structure which has been formed by the molecules of the other. Clathrate compounds are now emerging on the chemical scene to take a place of increasing importance. Their formation is novel, and their properties are unique. When forming they appear to disdain the normal types of bonding and seldom do they fall into strictly inorganic or organic classifications. Though they are similar to inclusion compounds, in fact are a type of inclusion compound, clathrates are generally more thorough in their inclusion propensities."

See also the following quotations:

McGraw-Hill Encyclopedia of Science and Technology, vol. 3:

"Clathrate compounds

"Well-defined addition compounds formed by inclusion of molecules in cavities formed by crystal lattices or present in large molecules. The constituents are bound in definite ratios but these are not necessarily integral. The components are not held together by primary valence forces but instead are the consequence of a tight fit which prevents the smaller partner from escaping. Consequently, the geometry of the molecules is the decisive factor."

Chemistry of the Coordination Compounds, John C. Bailar:

"Clathrates

"Another group of molecular compounds in which the geometry of crystal lattice is of prime importance is the clathrates. These are compounds in which one component is trapped in a 'cage' lattice structure of the second component. It is evident that the ratio of the two components might be integral only in the limiting case, that is, in the event of a perfect lattace where every cage is filled with the requisite number of molecules of the other component.

"In these compounds, the nature of the trapped component depends not at all on chemical properties but only on molecular size. This is illustrated very sharply by the clathrates which hydroquinone forms with such chemically unrelated substances as $H_2S$, $SO_2$, $CH_3OH$, $CH_3CN$, $HCOOH$, $CO_2$, $HCl$, $HBr$, $HC \equiv CH$, A, Kr, and Xe. The three inert gases emphasize the point that chemical bonds cannot be involved in the formation of these compounds. The X-ray work of Powell has been instrumental in elucidating the structures of clathrate compounds."

Webster's Dictionary:

"Clathrate compounds

"Relating to a type of solid molecular compound in which one component is trapped in cavities of cagelike crystals of another component."

It has also been known that double salts of unique explosive properties can be formed which contain in the same crystal both an oxidizer and a fuel which tend to react with each other under such stimulus as a comparatively light blow or weak flame. The use of compounds of this character is advantageous in explosive compositions, since the intergranular space separating the fuel, oxidizer and other components of an explosive mixture, is wholly eliminated. See, for example, such patents as that of Willi Brun et al., No. 2,116,878, issued May 10, 1938, and Willi Brun, No. 2,175,826, issued Oct. 10, 1939.

The compounds to which this invention relates are triple and higher complex salts, many of which to an unusually high degree combine in a single complex compound the functions of explosive, oxidizer and fuel.

Lead picrate is a well known explosive material of wide utility and it is lead picrate which forms the essential primary explosive ingredient of the complex salts to which this invention relates.

Similarly, lead nitrate is a widely used oxidizer in explosive compositions and is the oxidizer in those complex salts containing a "built in" oxidizer to which this invention relates.

Double salts of basic lead picrate and lead nitrate are known but their percussion sensitivity is not such as to have made them useful in ammunition priming compositions.

As fuel components and/or modifiers of the explosive reaction in the complex salts to which this invention relates I have found a substantial number of useful materials some of which are, in and of themselves, powerful although oxygen deficient explosives. Among those which may be mentioned as examples of such useful materials are lead acetate, lead hypophosphite, lead nitroaminoguanidine, lead azide, lead formate and lead propionate. Of these, lead nitroaminoguanidine and lead azide will be recognized as explosives.

FIGURES 1 through 16 are reproductions of X-ray diffractometer charts comparing the exemplary complex salts of Examples 1 and 27 produced in accordance with this invention with the constituent salts and with various mechanical mixtures to demonstrate conclusively the differences between the complex salts and the mixtures. The material tested is in each case identified beneath the figure number. Since all runs were made at the same speed of 1° per minute, the same horizontal scale of "Degrees Rotation" is applicable.

Forty-four specific examples of the explosives produced in accordance with this invention and procedures for their preparation are set forth in the following examples:

*Example 1*

A laboratory method of preparation of the triple salts of this invention may be illustrated by reference to the preparation of the monobasic lead picrate·lead nitrate·lead acetate wherein the following procedure is followed:

(1) Add 23.0 grams of picric acid and 14.5 grams of sodium acetate (hydrated) to 250 cc. of water with stirring.
(2) Raise temperature to 50–55° C.
(3) Add with stirring 8.5 to 9.5 grams of sodium hydroxide dissolved in 50 cc. of water.
(4) After five minutes add a solution of 110.0 grams of lead nitrate in 300 cc.'s of water. Addition time is 15 minutes.
(5) Continue stirring for 20–30 minutes.
(6) Filter and wash with water.

Yield: approximately 64.0 grams.

*Example 1a*

A plant scale method of preparing the same explosive is as follows:

(1) Add 10 pounds 2 ounces of picric acid (dry basis) to 30 liters of water with stirring in a stainless steel kettle provided with a heating jacket.
(2) Raise temperature to 105° F.
(3) Add a solution containing 4 pounds 3 ounces of caustic soda and 7 pounds 3 ounces of sodium acetate in 7½ liters of water from a separatory funnel over a 7 minute period. $P_H$ should be 11.8 to 12.3.
(4) Raise temperature to 120° F. Hold at this temperature throughout the remainder of the process.
(5) After 5 minutes add a solution of 44 pounds of lead nitrate in 40 liters of water. Addition time 35 minutes.
(6) Continue stirring for 20 minutes. $P_H$ 4.7 to 5.3.
(7) Stop stirring, cool and settle for 5 minutes.
(8) Filter and wash 9 times with water.

Yield: approximately 23 pounds.

The product is a sensitive and powerful primary explosive composed of well defined crystals of thick hexagonal plate form and yellow coloration. It is relatively insensitive to static electricity and when wet with 25% water cannot be detonated even under such powerful stimulus as the explosion of a No. 8 blasting cap.

Figure 1:
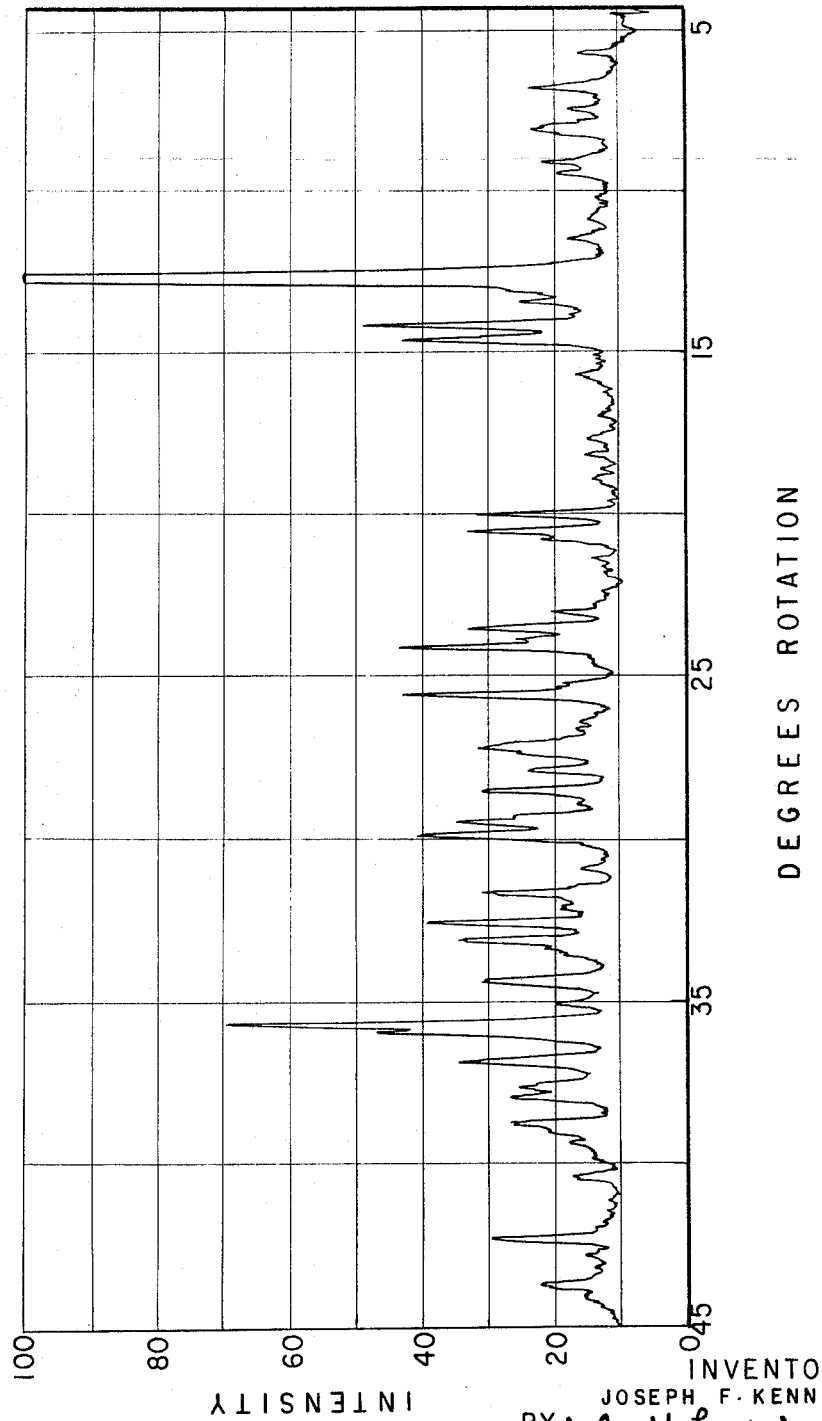

FIGURE 1 is an exemplary X-ray diffractometer chart of this material and by comparison with FIGS. 2, 3, 4 and 10 through 15 can be seen to be a distinctively different compound than any of the constituents or mixtures of them.

Figure 11:
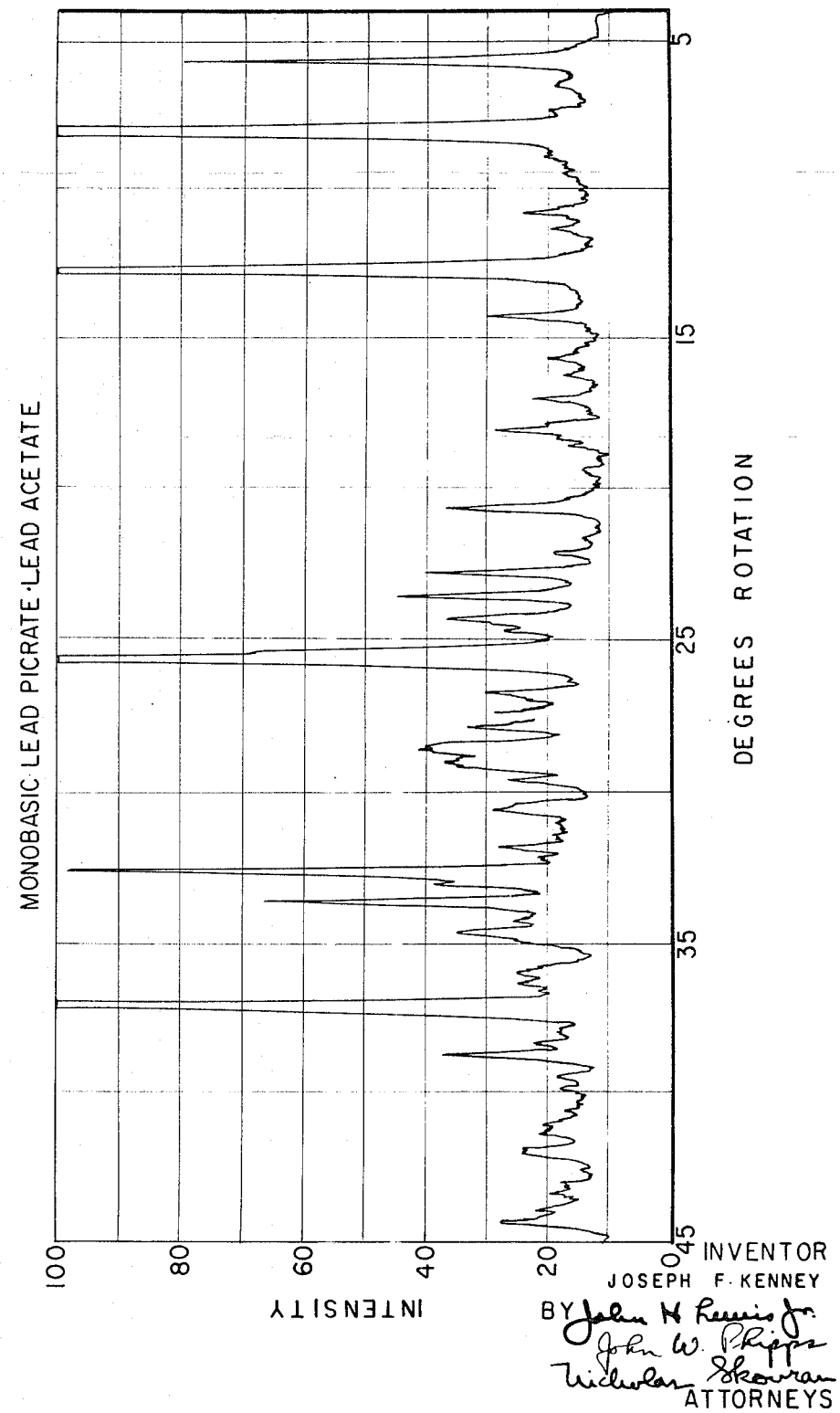
Figure 12:
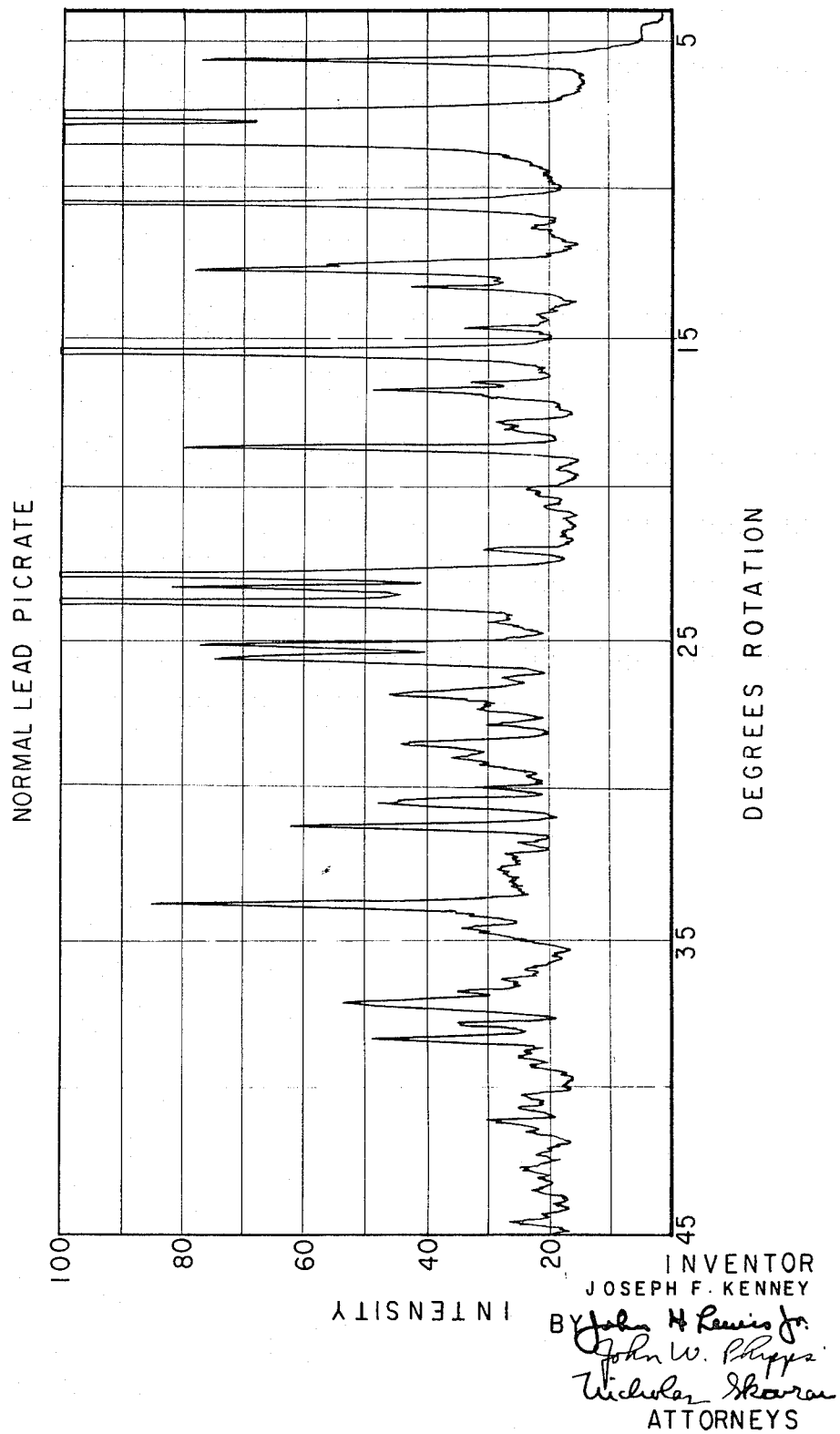

The X-ray diffraction pattern run on monobasic lead picrate·lead nitrate·lead acetate (FIG. 1) proves that this is a true compound and not a mixture of either (1) lead picrate plus lead hydroxide plus lead nitrate plus lead acetate (FIG. 2), or (2) a mixture of monobasic lead picrate·lead nitrate plus lead acetate (FIG. 3), or (3) monobasic lead picrate·lead acetate plus lead nitrate (FIG. 4) because the X-ray diffraction patterns of these mixtures are different from the X-ray diffraction pattern of the triple salt. Lead picrate (FIG. 12), lead hydroxide (FIG. 13), lead nitrate (FIG. 14) or lead acetate (FIG. 15) do not occur as such in the triple salt because the X-ray diffraction patterns of these compounds do not appear in the X-ray diffraction pattern of the triple salt. The X-ray diffraction pattern of monobasic lead picrate·lead nitrate·lead acetate (FIG. 1) has some peaks in common with monobasic lead picrate·lead acetate (FIG. 11). The triple salt is therefore properly identified as a clathrate compound in which monobasic lead picrate·lead acetate is the host. A comparison of the X-ray diffraction pattern done on Oct. 2, 1963, of a 21-pound batch of monobasic lead picrate·lead nitrate·lead acetate shows it to be the identical compound produced in a 90 gm. laboratory batch the X-ray diffraction pattern of which was done May 1960. Position of peaks coincide completely. Height of the peaks or intensities recorded vary moderately because a different X-ray detector was used.

Its properties may be tabulated as follows:

Color _____ Yellow.
Crystal appearance_____ Well defined thick hexagonal plates.
Apparent density_____ 1.30+ gms. per cc.
Explosion point_____ 283° C. measured on a temperature gradient bar.
Sensitivity to static_____ No samples fired when exposed to discharger of 300 mmfd. capacitor at 6000 volts.

The chemical composition is monobasic lead picrate·lead nitrate·lead acetate, and can be represented by the formula

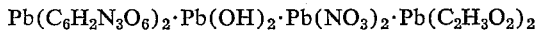

$$Pb(C_6H_2N_3O_6)_2 \cdot Pb(OH)_2 \cdot Pb(NO_3)_2 \cdot Pb(C_2H_3O_2)_2$$

In the preparation of the other complex salts, similar methods may be followed, it being noted that the lead salt last added acts as a combining and precipitating agent and that the third salts employed are all lead salts of monovalent acids of not greater acid strength than picric acid and which also form water-soluble sodium salts by which the anion radicals may be introduced before starting the precipitation. In most instances it is preferable to dissolve the third salt with caustic soda and add this solution to a solution of picric acid before adding the combining and precipitating agent.

As in the case of all clathrate compounds, these complexes are believed to result from the substantially complete enclosure of molecules within a structure of two or more molecules of other components in such a manner as to prevent the escape of the enclosed molecules unless the strong forces which bind the enclosing molecules together can be broken. From the fact that the final operation involves repeated washing with water and that the explosives may be stored wet indefinitely without change in composition, it is also apparent that these are true compounds rather than mixtures, for components like lead nitrate and lead acetate are readily soluble and if not locked up in the structure of the clathrate compound would be leached out of the mixture during washing or wet storage.

*Example 2*

To prepare monobasic lead picrate·lead nitrate·lead hypophosphite the following procedure may be employed:

(1) Add 23.0 grams of picric acid to 250 cc. of water with stirring.
(2) Add 8.5 to 9.5 grams of sodium hydroxide and 12.0 grams of sodium hypophosphite to 50 cc. of water, stirring continuously.
(3) Mix the two solutions and raise the temperature to 70 to 75° C.
(4) With stirring, add a solution of 110 grams of lead nitrate in 300 cc. of water to 3.
(5) Continue stirring for 30 minutes, maintaining temperature.
(6) Filter, wash with water, and dry.

Yield: approximately 60 grams.

The product is a sensitive and powerful primary explosive composed of well defined crystals of thin hexagonal platelike form and of yellow coloration. Its explosion point is 263° C. and static sensitivity is such that 5 out of 5 samples fire only when exposed to the discharge of a 300 mmfd. capacitor charged to at least 3,000 volts.

The chemical composition is monobasic lead picrate·lead nitrate·lead hypophosphite, and can be represented by the formula $$Pb(C_6H_2N_3O_7)_2 \cdot Pb(OH)_2 \cdot Pb(NO_3)_2 \cdot Pb(H_2PO_2)_2$$

*Example 3*

To prepare monobasic lead picrate·lead nitrate·lead nitroaminoguanadine, the following procedure may be employed:

(1) Add 230 grams of picric acid and 12.0 grams of nitroaminoguanadine to 250 cc. of water.
(2) Add 12.5 to 13.5 grams of sodium hydroxide to 50 cc. of water.
(3) Mix 1 and 2 and raise temperature to 50 to 55° C.
(4) With stirring, add to 3, 110 grams of lead nitrate in 300 cc. of water.
(5) Hold at temperature for 30 minutes, with continued stirring.
(6) Filter, wash with water, and dry.

Yield: approximately 70 grams.

The product is a mild but sensitive primary explosive of yellow coloration and amorphous structure. Its explosion point is 254° C. and its static sensitivity is such that 5 out of 5 samples fire only when exposed to the discharge of a 300 mmfd. capacitor charged to at least 2,000 volts.

The chemical composition is monobasic lead picrate·lead nitrate·lead nitroaminoguanadine, and can be represented by the formula $$Pb(C_6H_2N_3O_7)_2 \cdot Pb(OH)_2 \cdot Pb(NO_3)_2 \cdot Pb(CN_5H_4O_2)_2$$

*Example 4*

To prepare monobasic lead picrate·lead nitrate·lead chlorate, the following procedure may be employed:

(1) Add 23.0 grams of picric acid to 250 cc. of water.
(2) Add 12.0 grams of sodium chlorate and 8.5 to 9.5 grams sodium hydroxide to 50 cc. water.
(3) Mix 1 and 2 and raise temperature to 50 to 55° C.
(4) With stirring, add to 3, 110 grams lead nitrate in 300 cc. water.
(5) Hold at temperature noted above for 30 minutes, with continued stirring.
(6) Filter, wash with water, and dry.

Yield: approximately 65 grams.

The product is a powerful and sensitive primary explosive of yellow coloration and amorphous structure. Its explosion point is 293° C. and its static sensitivity is such that 5 out of 5 samples fire only when exposed to the discharge of a 300 mmfd. capacitor charged to at least 3,000 volts.

The chemical composition is monobasic lead picrate·lead nitrate·lead chlorate, and can be represented by the formula $$Pb(C_6H_2N_3O_7)_2 \cdot Pb(OH)_2 \cdot Pb(NO_3)_2 \cdot Pb(ClO_3)_2$$

*Example 5*

To prepare monobasic lead picrate·lead nitrate·lead azide the following procedure may be employed:

(1) Add 23.0 grams of picric acid to 250 cc. of water.
(2) Add 7.0 grams of sodium azide and 8.5 to 9.5 grams of sodium hydroxide to 50 cc. water.
(3) Mix 1 and 2 and raise temperature to 70 to 75°.
(4) With stirring, add to 3, 110 grams lead nitrate in 300 cc. water.
(5) Hold at temperature noted above for 30 minutes, with continued stirring.
(6) Filter, wash with water, and dry.

Yield: approximately 60 grams.

The product is a powerful, sensitive primary explosive composed of crystals in the form of elongated thin plates. The color is yellow. Its explosion point is 278° C., and its static sensitivity is such that no samples fired when exposed to the discharge of a 300 mmfd. capacitor charged to 4,000 volts.

The chemical composition is monobasic lead picrate·lead nitrate·lead azide, and can be represented by the formula $$Pb(C_6H_2N_3O_7)_2 \cdot Pb(OH)_2 \cdot Pb(NO_3)_2 \cdot Pb(N_3)_2$$

*Example 6*

To prepare monobasic lead picrate·lead nitrate·lead formate the following procedure may be employed:

(1) Add 23.0 grams of picric acid to 250 cc. of water.
(2) Add 7.0 grams of sodium formate and 8.5 to 9.5 grams of sodium hydroxide to 50 cc. water.
(3) Mix 1 and 2 and raise temperature to 70 to 75° C.
(4) With stirring, add to 3, 110 grams of lead nitrate in 300 cc. water.
(5) Hold at temperature noted above for 30 minutes, with continued stirring.
(6) Filter, wash with water, and dry.

Yield: approximately 60 grams.

The product is a powerful sensitive primary explosive in the form of well defined rectangular thin plates of yellow color. Its explosion point is 288° C., and its static sensitivity is such that samples would not fire when exposed to the discharge of a 300 mmfd. capacitor charged to 4,000 volts.

The chemical composition is monobasic lead picrate·lead nitrate·lead formate, and can be represented by the formula $$Pb(C_6H_2N_3O_7)_2 \cdot Pb(OH)_2 \cdot Pb(NO_3)_2 \cdot Pb(HCO_2)_2$$

*Example 7*

To prepare monobasic lead picrate·lead nitrate·lead propionate, the following procedure may be employed:

(1) Add 23.0 grams of picric acid to 250 cc. water.
(2) Add 10.0 grams of sodium propionate and 8.5 to 9.5 grams of sodium hydroxide to 50 cc. water.
(3) Mix 1 and 2 and raise temperature to 50 to 55° C.
(4) With stirring, add to 3, 110 grams lead nitrate in 300 cc. water.
(5) Maintain temperature noted above for 30 minutes, continue stirring.

(6) Filter, wash with water, and dry.
    Yield: approximately 65.0 grams.

The product is a powerful, sensitive primary explosive in the form of thick hexagonal plates of yellow coloration. Its explosion point is 265° C., and its static sensitivity is such that 5 out of 5 samples fire only when exposed to the discharge of a 300 mmfd. capacitor charged to at least 3,000 volts.

The chemical composition is monobasic lead picrate·lead nitrate·lead propionate, and can be represented by the formula $$Pb(C_6H_2N_3O_7)_2 \cdot Pb(OH)_2 \cdot Pb(NO_3)_2 \cdot Pb(C_3H_5O_2)_2$$

Example 8

To prepare monobasic lead picrate·lead nitrate·lead glycolate, the following procedure may be employed:

(1) Add 23.0 grams of picric acid to 300 cc. water with stirring.
(2) Add 13.5 to 14.5 grams of sodium hydroxide and 8.5 grams glycolic acid to 100 cc. water, stirring continuously.
(3) Mix 1 and 2 and raise temperature to 50 to 55° C.
(4) With stirring, add to 3, 110 grams lead nitrate in 300 cc. water.
(5) Maintain temperature noted above for 30 minutes, continue stirring.
(6) Filter, wash with water, and dry.
    Yield: approximately 55 grams.

The product is a powerful primary explosive composed of well defined crystals of yellow fine plate form. Its explosion point is 282° C., and its static sensitivity is such that it would not fire when exposed to a discharge of a 300 mmfd. capacitor charged to 4,000 volts.

The chemical composition is monobasic lead picrate·lead nitrate·lead glycolate, and can be represented by the formula $$Pb(C_6H_2N_3O_7)_2 \cdot Pb(OH)_2 \cdot Pb(NO_3)_2 \cdot Pb(C_2H_3O_3)_2$$

Example 9

To prepare monobasic lead picrate·lead nitrate·lead lactate, the following procedure may be employed:

(1) Add 23.0 grams of picric acid to 300 cc. water with stirring.
(2) Add 13.5 to 14.5 grams of sodium hydroxide and 11.0 grams (90%) lactic acid to 100 cc. water, stirring continuously.
(3) Mix 1 and 2 and raise temperature to 50 to 55° C.
(4) With stirring, add to 3, 110 grams lead nitrate in 300 cc. water.
(5) Maintain temperature noted above for 30 minutes, continue stirring.
(6) Filter, wash with water, and dry.
    Yield: approximately 55 grams.

The product is a powerful primary explosive composed of well defined crystals of yellow small plate form. Its explosion point is 276° C., and its static sensitivity is such that 5 out of 5 samples fired when exposed to a discharge of a 300 mmfd. capacitor charged to 2,000 volts.

The chemical composition is monobasic lead picrate·lead nitrate·lead lactate, and can be represented by the formula.

$$Pb(C_6H_2N_3O_7)_2 \cdot Pb(OH)_2 \cdot Pb(NO_3)_2 \cdot Pb(C_3H_5O_3)_2$$

Example 10

To prepare monobasic lead picrate·lead nitrate·lead amino acetate, the following procedure may be employed:

(1) Add 23.0 grams of picric acid to 300 cc. water with stirring.
(2) Add 13.5 to 14.5 grams of sodium hydroxide and 8.0 grams of amino acetic acid to 150 cc. of water, stirring continuously.
(3) Mix 1 and 2 and raise temperature to 50 to 55° C.
(4) With stirring, add to 3, 110 grams of lead nitrate in 300 cc. water.
(5) Continue stirring. Maintain temperature noted above for 30 minutes.
(6) Filter, wash with water, and dry.
    Yield: approximately 55 grams.

The product is a powerful primary explosive composed of well defined crystals of orange rectangular plate form. Its explosion point is 274° C., and its static sensitivity is such that 4 out of 5 samples fire when exposed to a discharge of a 300 mmfd. capacitor charged to 1,000 volts.

The chemical composition is monobasic lead picrate·lead nitrate·lead amino acetate, and can be represented by the formula.

$$Pb(C_6H_2N_3O_7)_2 \cdot Pb(OH)_2 \cdot Pb(NO_3)_2 \cdot Pb(C_2H_4NO_2)_2$$

Example 11

To prepare monobasic lead picrate·lead nitrate·lead acrylate the following procedure may be employed:

(1) Add 23.0 grams of picric acid to 300 cc. water with stirring.
(2) Add 13.5 to 14.5 grams of sodium hydroxide and 7.5 grams of acrylic acid to 100 cc. water, stirring continuously.
(3) Mix 1 and 2 and raise temperature to 50 to 55° C.
(4) With stirring, add to 3, 110 grams of lead nitrate in 300 cc. water.
(5) Continue stirring. Maintain temperature noted above for 30 minutes.
(6) Filter, wash with water and dry.
    Yield: approximately 55 grams.

The product is a powerful primary explosive composed of well defined crystals of yellow fine plate form. Its explosion point is 275° C., and its static sensitivity is such that 4 out of 5 samples fire when exposed to a discharge of a 300 mmfd. capacitor charged to 2,000 volts.

The chemical composition is monobasic lead picrate·lead nitrate·lead acrylate, and can be represented by the formula $$Pb(C_6H_2N_3O_7)_2 \cdot Pb(OH)_2 \cdot Pb(NO_3)_2 \cdot Pb(C_3H_3O_2)_2$$

Example 12

To prepare monobasic lead picrate·lead nitrate·lead methacrylate, the following procedure may be employed:

(1) Add 23.0 grams of picric acid to 300 cc. water with stirring.
(2) Add 13.5 to 14.5 grams of sodium hydroxide and 8.8 grams of methacrylic acid to 100 cc. water, stirring continuously.
(3) Mix 1 and 2 and raise temperature to 50 to 55° C.
(4) With stirring, add to 3, 110 grams of lead nitrate in 300 cc. water.
(5) Continue stirring. Maintain temperature noted above for 30 minutes.
(6) Filter, wash with water, and dry.
    Yield: approximately 55 grams.

The product is a powerful primary explosive composed of well defined crystals of yellow thick hexagonal plate form. Its explosion point is 283° C., and its static sensitivity is such that 3 out of 5 samples fire when exposed to a discharge of a 300 mmfd. capacitor charged to 4,000 volts.

The chemical composition is monobasic lead picrate·lead nitrate·lead methacrylate, and can be represented by the formula $$Pb(C_6H_2N_3O_7)_2 \cdot Pb(OH)_2 \cdot Pb(NO_3)_2 \cdot Pb(C_4H_5O_2)_2$$

Example 13

To prepare monobasic lead picrate·lead nitrate·lead butyrate, the following procedure may be employed:

(1) Add 23.0 grams of picric acid to 300 cc. water with stirring.
(2) Add 13.5 to 14.5 grams of sodium hydroxide and 8.8 grams of butyric acid to 100 cc. water, stirring continuously.
(3) Mix 1 and 2 and raise temperature to 50 to 55° C.
(4) With stirring, add to 3, 110 grams of lead nitrate in 300 cc. water.
(5) Continue stirring. Maintain temperature noted above for 30 minutes.
(6) Filter, wash with water, and dry.
Yield: approximately 55 grams.

The product is a powerful primary explosive composed of well defined crystals of yellow thick hexagonal plate form. Its explosion point is 282° C., and its static sensitivity is such that 5 out of 5 samples fire when exposed to a discharge of a 300 mmfd. capacitor charged to 2,000 volts.

The chemical composition is monobasic lead picrate·lead nitrate·lead butyrate and can be represented by the formula $$Pb(C_6H_2N_3O_7)_2 \cdot Pb(OH)_2 \cdot Pb(NO_3)_2 \cdot Pb(C_4H_7O_2)_2$$

The procedure for preparing salts of dibasic lead picrate is similar to those noted above with appropriate adjustment of the quantities of the reactants.

Example 14

Diabasic lead picrate·lead nitrate·lead acetate may be prepared by the following procedure:

(1) Add 23.0 grams of picric acid to 550 cc. water.
(2) Add 28.0 grams of sodium acetate and 17.0 to 19.0 grams of sodium hydroxide to 50 cc. water.
(3) Combine 1 and 2 and raise temperature to 70 to 75° C.
(4) Add 220 grams lead nitrate to 600 cc. of water and with stirring add to 3.
(5) Maintain temperature noted above for 30 minutes. Continue stirring.
(6) Filter, wash with water, and dry the precipitate.
Yield: approximately 95.0 grams.

The product is a powerful, sensitive primary explosive which exists in the crystalline form of elongated hexagonal thin plates of yellow color. Its explosion point is 280° C., and its static sensitivity is such that no samples fire when exposed to the discharge of a 300 mmfd. capacitor charged to 4,000 volts.

The chemical composition is dibasic lead picrate·lead nitrate·lead acetate and can be represented by the formula $$Pb(C_6H_2N_3O_7)_2 \cdot 2Pb(OH)_2 \cdot 2Pb(NO_3)_2 \cdot 2Pb(C_2H_3O_2)_2$$

Example 15

Dibasic lead picrate·lead nitrate·lead azide may be prepared by the following procedure:

(1) Add 23.0 grams picric acid to 550 cc. water.
(2) Add 14.0 grams sodium azide and 17.0 to 19.0 grams sodium hydroxide to 50 cc. water.
(3) Combine 1 and 2 and raise temperature to 70 to 75° C.
(4) Add 220 grams lead nitrate to 600 cc. water and add, with stirring, to 3.
(5) Maintain at temperature noted above for 30 minutes. Continue stirring.
(6) Filter, wash with water, and dry the precipitate.
Yield: approximately 95.0 grams.

The product is a sensitive primary explosive in the form of thin platelike crystals of yellow color. The explosion point is 280° C., and the static sensitivity is such that no samples would fire when exposed to the discharge of a 300 mmfd. capacitor charged to at least 4,000 volts.

The chemical composition is dibasic lead picrate·lead nitrate·lead azide and can be represented by the formula $$Pb(C_6H_2N_3O_7)_2 \cdot 2Pb(OH)_2 \cdot 2Pb(NO_3)_2 \cdot 2Pb(N_3)_2$$

Example 16

Dibasic lead picrate·lead nitrate·lead glycolate may be prepared by the following procedure:

(1) Add 23.0 grams picric acid to 600 cc. water with stirring.
(2) Add 27.0 to 29.0 grams of sodium hydroxide and 17.0 grams of glycolic acid to 150 cc. of water, stirring continuously.
(3) Mix the two solutions and raise the temperature to 50 to 55° C.
(4) With stirring, add a solution of 220 grams of lead nitrate in 600 cc. of water to 3.
(5) Continue stirring for 30 minutes maintaining temperature.
(6) Filter, wash with water, and dry.
Yield: approximately 90 grams.

The product is a weak primary explosive composed of well defined crystals of yellow fine needle form. Its explosion point is 278° C., and its static sensitivity is such that it would not fire when exposed to a discharge of a 300 mmfd. capacitor charged to 4,000 volts.

The chemical composition is dibasic lead picrate·lead nitrate·lead glycolate and can be represented by the formula $$Pb(C_6H_2N_3O_7)_2 \cdot 2Pb(OH)_2 \cdot 2Pb(NO_3)_2 \cdot 2Pb(C_2H_3O_3)_2$$

Example 17

Dibasic lead picrate·lead nitrate·lead lactate may be prepared by the following procedure:

(1) Add 23.0 grams picric acid to 600 cc. water with stirring.
(2) Add 27.0 to 29.0 grams of sodium hydroxide and 22.0 grams (90%) lactic acid to 150 cc. of water, stirring continuously.
(3) Mix the two solutions and raise the temperature to 50 to 55° C.
(4) With stirring, add a solution of 220 grams of lead nitrate in 600 cc. of water to 3.
(5) Continue stirring for 30 minutes maintaining temperature.
(6) Filter, wash with water, and dry.
Yield: approximately 90 grams.

The product is a powerful primary explosive composed of well defined crystals of small yellow plate form. Its explosion point is 276° C., and its static sensitivity is such that 5 of 5 fire when exposed to a discharge of a 300 mmfd. capacitor charged to 2,000 volts.

The chemical composition is dibasic lead picrate·lead nitrate·lead lactate and can be represented by the formula $$Pb(C_6H_2N_3O_7)_2 \cdot 2Pb(OH)_2 \cdot 2Pb(NO_3)_2 \cdot 2Pb(C_3H_5O_2)_2$$

Example 18

Dibasic lead picrate·lead nitrate·lead amino acetate may be prepared by the following procedure:

(1) Add 23.0 grams picric acid to 600 cc. water with stirring.
(2) Add 27.0 to 29.0 grams of sodium hydroxide and 16.0 grams of amino acetic acid to 200 cc. of water stirring continuously.
(3) Mix the two solutions and raise the temperature to 50 to 55° C.
(4) With stirring, add a solution of 220 grams of lead nitrate in 600 cc. of water to 3.

(5) Continue stirring for 30 minutes maintaining temperature.
(6) Filter, wash with water and dry.
Yield: approximately 90 grams.

The product is a very weak primary explosive composed of well defined crystals of orange large needle form. Its explosion point is 272° C., and its static sensitivity is such that 2 of 5 fire when exposed to a discharge of a 300 mmfd. capacitor charged to 4,000 volts.

The chemical composition is dibasic lead picrate·lead nitrate·lead amino acetate and can be represented by the formula

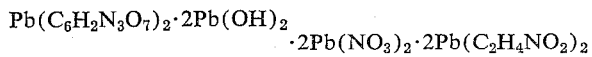

$$Pb(C_6H_2N_3O_7)_2 \cdot 2Pb(OH)_2 \cdot 2Pb(NO_3)_2 \cdot 2Pb(C_2H_4NO_2)_2$$

*Example 19*

Dibasic lead picrate·lead nitrate·lead acrylate may be prepared by the following procedure:

(1) Add 23.0 grams picric acid to 600 cc. water with stirring.
(2) Add 27.0 to 29.0 grams of sodium hydroxide and 15.0 grams of acrylic acid to 150 cc. of water stirring continuously.
(3) Mix the two solutions and raise the temperature to 50 to 55° C.
(4) With stirring, add a solution of 220 grams of lead nitrate in 600 cc. of water to 3.
(5) Continue stirring for 30 minutes maintaining temperature.
(6) Filter, wash with water and dry.
Yield: approximately 90 grams.

The product is a powerful primary explosive composed of well defined crystals of yellow needle form. Its explosion point is 273° C., and its static sensitivity is such that 5 of 5 fire when exposed to a discharge of a 300 mmfd. capacitor charged to 3,000 volts.

The chemical composition is dibasic lead picrate·lead nitrate·lead acrylate, and can be represented by the formula $$Pb(C_6H_2N_3O_7)_2 \cdot 2Pb(OH)_2 \cdot 2Pb(NO_3)_2 \cdot 2Pb(C_3H_3O_2)_2$$

*Example 20*

Dibasic lead picrate·lead nitrate·lead methacrylate may be prepared by the following procedure:

(1) Add 23.0 grams picric acid to 600 cc. water with stirring.
(2) Add 27.0 to 29.0 grams of sodium hydroxide and 17.6 grams of methacrylic acid to 150 cc. of water stirring continuously.
(3) Mix the two solutions and raise the temperature to 50 to 55° C.
(4) With stirring, add a solution of 220 grams of lead nitrate in 600 cc. of water to 3.
(5) Continue stirring for 30 minutes maintaining temperature.
(6) Filter, wash with water and dry.
Yield: approximately 90 grams.

The product is a powerful primary explosive composed of well defined crystals of yellow elongated rectangular parallelopiped form. Its explosion point is 272° C., and its static sensitivity is such that 3 of 5 fire when exposed to a discharge of a 300 mmfd. capacitor charged to 4,000 volts.

The chemical composition is dibasic lead picrate·lead nitrate·lead methacrylate, and can be represented by the formula $$Pb(C_6H_2N_3O_7)_2 \cdot 2Pb(OH)_2 \cdot 2Pb(NO_3)_2 \cdot 2Pb(C_4H_5O_2)_2$$

*Example 21*

Dibasic lead picrate·lead nitrate·lead butyrate may be prepared by the following procedure:

(1) Add 23.0 grams picric acid to 600 cc. water with stirring.
(2) Add 27.0 to 29.0 grams of sodium hydroxide and 17.6 grams of butyric acid to 150 cc. of water stirring continuously.
(3) Mix the two solutions and raise the temperature to 50 to 55° C.
(4) With stirring, add a solution of 220 grams of lead nitrate in 600 cc. of water to 3.
(5) Continue stirring for 30 minutes maintaining temperature.
(6) Filter, wash with water and dry.
Yield: approximately 90 grams.

The product is a powerful primary explosive composed of well defined crystals of yellow needle form. Its explosion point is 280° C., and its static sensitivity is such that 5 of 5 fire when exposed to a discharge of a 300 mmfd. capacitor charged to 1,000 volts.

The chemical composition is dibasic lead picrate·lead nitrate·lead butyrate, and can be represented by the formula $$Pb(C_6H_2N_3O_7)_2 \cdot 2Pb(OH)_2 \cdot 2Pb(NO_3)_2 \cdot 2Pb(C_4H_7O_2)_2$$

*Example 22*

Tribasic lead picrate·lead nitrate·lead acetate may be prepared by the following procedure:

(1) Add 23.0 grams of picric acid to 950 cc. water.
(2) 42.0 grams sodium acetate and 25.5 to 28.5 grams sodium hydroxide to 50 cc. water.
(3) Combine (1) and (2) and raise temperature to 70 to 75° C.
(4) Add 330 grams lead nitrate to 1,000 cc. water and, with stirring, add to (3).
(5) Maintain temperature noted above for 30 minutes, and continue stirring.
(6) Filter, wash with water, and dry the precipitate.
Yield: approximately 130 grams.

The product is a mild but sensitive primary explosive. Its color is yellow and its crystalline structure is that of elongated rectangular parallelopipeds. Its explosion point is 280° C., and its static sensitivity is such that no samples fired when exposed to the discharge of a 300 mmfd. capacitor charged to 4,000 volts.

The chemical composition is tribasic lead picrate·lead nitrate·lead acetate, and can be represented by the formula $$Pb(C_6H_2N_3O_7)_2 \cdot 3Pb(OH)_2 \cdot 3Pb(NO_3)_2 \cdot 3Pb(C_2H_3O_2)_2$$

*Example 23*

Tribasic lead picrate·lead nitrate·lead azide may be prepared by the following procedure:

(1) Add 23.0 grams picric acid to 950 cc. water.
(2) Add 21.0 grams sodium azide and 25.5 to 28.5 grams of sodium hydroxide to 50 cc. water.
(3) Combine (1) and (2) and raise temperature to 70 to 75° C.
(4) Add 330 grams lead nitrate to 1,000 cc. water and, add, with stirring, to (3).
(5) Maintain temperature noted above for 30 minutes, and continue stirring.
(6) Filter, wash with water, and dry the precipitate.
Yield: approximately 125 grams.

The product is an extremely sensitive powerful primary explosive. Its color is yellow and it crystallizes in the form of small parallelopipeds. Its explosion point is 292° C., and its static sensitivity is such that no samples would fire when exposed to the discharge of a 300 mmfd. capacitor charged to 4,000 volts.

The chemical composition is tribasic lead picrate·lead nitrate·lead azide, and can be represented by the formula $$Pb(C_6H_2N_3O_7)_2 \cdot 3Pb(OH)_2 \cdot 3Pb(NO_3)_2 \cdot 3Pb(N_3)_2$$

*Example 24*

Tribasic lead picrate·lead nitrate·lead lactate may be prepared by the following procedure:

(1) Add 23.0 grams picric acid to 1200 cc. water with stirring.
(2) Add 40.5 to 43.5 grams of sodium hydroxide and 33.0 grams 90% lactic acid to 150 cc. of water stirring continuously.
(3) Mix the two solutions and raise the temperature to 55° C.
(4) With stirring, add a solution of 330 grams of lead nitrate in 1000 cc. of water to (3).
(5) Continue stirring for 30 minutes maintaining temperature.
(6) Filter, wash with water and dry.
    Yield: approximately 120 grams.

The product is a very weak primary explosive composed of well defined crystals of yellow rod form. Its explosion point is 275° C., and its static sensitivity is such that 0 out of 5 fire when exposed to a discharge of a 300 mmfd. capacitor charged to 4,000 volts.

The chemical composition is tribasic lead picrate·lead nitrate·lead lactate, and can be represented by the formula $$Pb(C_6H_2N_3O_7)_2 \cdot 3Pb(OH)_2 \cdot 3Pb(NO_3)_2 \cdot 3Pb(C_3H_5O_3)_2$$

*Example 25*

Tribasic lead picrate·lead nitrate·lead acrylate may be prepared by the following procedure:

(1) Add 23.0 grams picric acid to 1000 cc. water with stirring.
(2) Add 40.5 to 43.5 grams of sodium hydroxide and 22.5 grams of acrylic acid to 200 cc. of water stirring continuously.
(3) Mix the two solutions and raise the temperature to 50 to 55° C.
(4) With stirring, add a solution of 330 grams of lead nitrate in 1000 cc. of water to 3.
(5) Continue stirring for 30 minutes maintaining temperature.
(6) Filter, wash with water and dry.
    Yield: approximately 115 grams.

The product is a weak primary explosive composed of well defined crystals of yellow fine needle form. Its explosion point is 270° C., and its static sensitivity is such that 1 of 5 fire when exposed to a discharge of a 300 mmfd. capacitor charged to 4,000 volts.

The chemical composition is tribasic lead picrate·lead nitrate·lead acrylate, and can be represented by the formula $$Pb(C_6H_2N_3O_7)_2 \cdot 3Pb(OH)_2 \cdot 3Pb(NO_3)_2 \cdot 3Pb(C_3H_3O_2)_2$$

*Example 26*

Tribasic lead picrate·lead nitrate·lead methacrylate may be prepared by the following procedure:

(1) Add 23.0 grams picric acid to 1000 cc. water with stirring.
(2) Add 40.5 to 43.5 grams of sodium hydroxide and 26.4 grams of methacrylic acid to 200 cc. of water stirring continuously.
(3) Mix the two solutions and raise the temperature to 50 to 55° C.
(4) With stirring, add a solution of 330 grams of lead nitrate in 1000 cc. of water to 3.
(5) Continue stirring for 30 minutes maintaining temperature.
(6) Filter, wash with water and dry.
    Yield: approximately 115 grams.

The product is a weak primary explosive composed of well defined crystals of yellow needle form. Its explosion point is 280° C., and its static sensitivity is such that 2 of 5 fire when exposed to a discharge of a 300 mmfd. capacitor charged to 4,000 volts.

The chemical composition is tribasic lead picrate·lead nitrate·lead methacrylate, and can be represented by the formula $$Pb(C_6H_2N_3O_7)_2 \cdot 3Pb(OH)_2 \cdot 3Pb(NO_3)_2 \cdot 3Pb(C_4H_5O_2)_2$$

Quadruple salts may also be prepared, as shown in the following examples:

*Example 27*

To prepare the quadruple salt monobasic lead picrate·lead nitrate·lead acetate·lead hypophosphite, the following procedure may be followed:

(1) Add 23.0 grams of picric acid to 250 cc. water.
(2) Add 7.0 grams of sodium acetate, 6.0 grams of sodium hypophosphite and 8.5 to 9.5 grams of sodium hydroxide to 50.0 cc. water.
(3) Mix 1 and 2 and raise temperature to 70 to 75° C.
(4) With stirring, add to 3, 110 grams lead nitrate in 300 cc. water.
(5) Maintain temperature noted above for 30 minutes. Continue stirring.
(6) Filter, wash with water, and dry.
    Yield: approximately 60 grams.

The product is a powerful, sensitive primary explosive in the form of well defined crystals of rectangular parallelopiped shape and of the color yellow. Its explosion point is 264° C., and its static sensitivity is such that 5 out of 5 samples fire only when exposed to the discharge of a 300 mmfd. capacitor charged to at least 4,000 volts.

The chemical composition is monobasic lead picrate·lead nitrate·lead acetate·lead hypophosphite, and can be represented by the formula $$Pb(C_6H_2N_3O_7)_2 \cdot Pb(OH)_2 \cdot Pb(NO_3)_2 \cdot \tfrac{1}{2}Pb(C_2H_3O_2)_2 \cdot \tfrac{1}{2}Pb(H_2PO_2)_2$$

Figure 5:
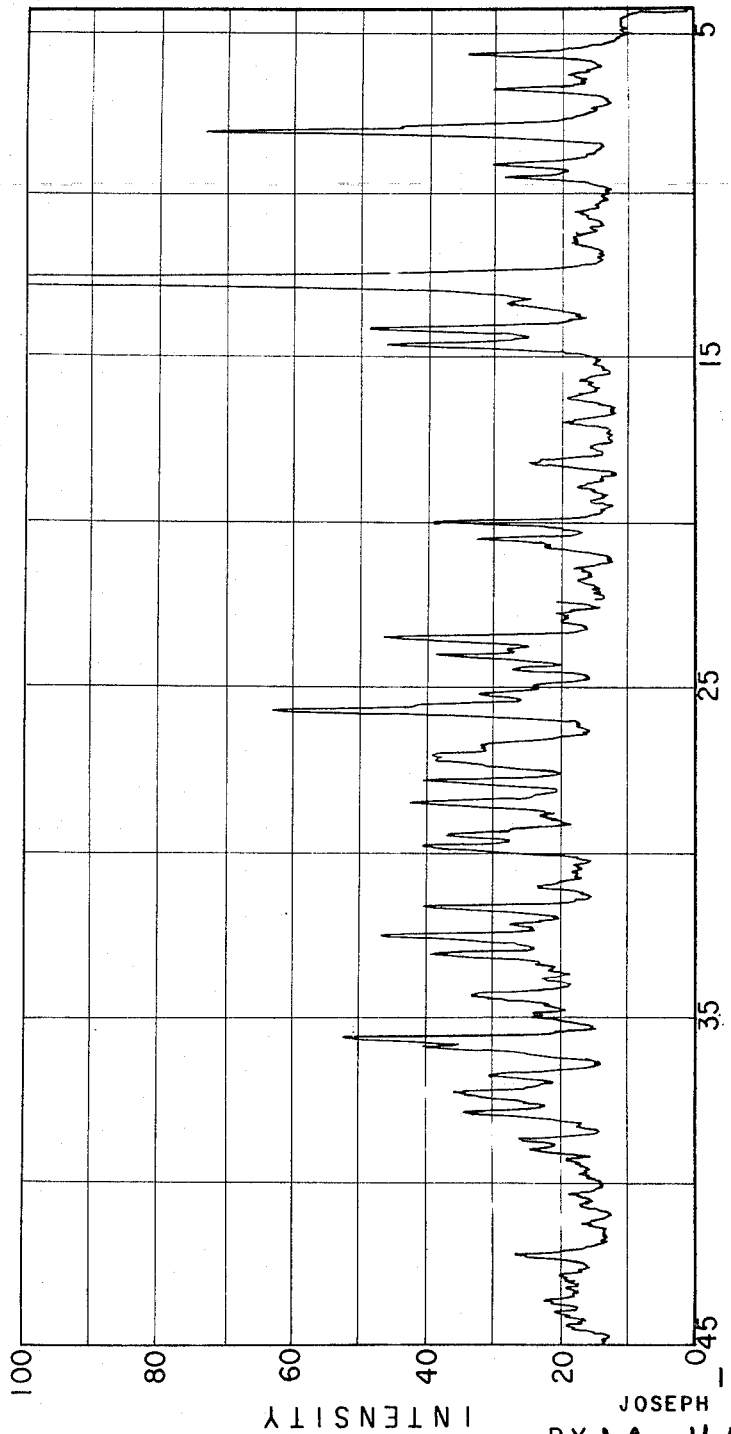

FIGURE 5 is an X-ray diffractometer chart made from monobasic lead picrate·lead nitrate·lead acetate·lead hypophosphite prepared in accordance with this example. This material is clearly demonstrated to be a true compound and not a mixture of (1) lead picrate plus lead hydroxide plus lead nitrate plus lead acetate plus lead hypophosphite (FIG. 6), or (2) a mixture of monobasic lead picrate·lead nitrate·lead acetate plus lead hypophosphite (FIG. 7), or (3) a mixture of monobasic lead picrate·lead nitrate plus lead acetate plus lead hypophosphite (FIG. 9), or (4) a mixture of monobasic lead picrate·lead acetate plus lead nitrate plus lead hypophosphite (FIG. 8), because the X-ray diffraction patterns of these mixtures are different from the X-ray diffraction pattern of the quadruple salt. Monobasic lead picrate·lead nitrate (FIG. 10), monobasic lead picrate·lead acetate (FIG. 11), lead picrate (FIG. 12), lead hydroxide (FIG. 13), lead nitrate (FIG. 14), lead acetate (FIG. 15) or lead hypophosphite (FIG. 16) do not occur as such in the quadruple salt because the X-ray patterns of these compounds do not appear in the X-ray pattern of the quadruple salt. The quadruple salt is a clathrate compound because its X-ray diffraction pattern has some peaks in common with the X-ray diffraction pattern of monobasic lead picrate·lead acetate, which appears to be the host material.

*Example 28*

To prepare the quadruple salt monobasic picrate·lead nitrate·lead hypophosphite·lead azide, the following procedure may be followed:

(1) Add 23.0 grams of picric acid to 250 cc. water.
(2) Add 3.5 grams of sodium azide, 6.0 grams of sodium hypophosphite and 8.5 to 9.5 grams of sodium hydroxide to 50 cc. of water.

(3) Mix 1 and 2 and raise temperature to 70 to 75° C.

(4) With stirring, add to 3, 110 grams of lead nitrate in 300 cc. water.

(5) Maintain temperature noted above for 30 minutes. Continue stirring.

(6) Filter, wash with water, and dry.
Yield: approximately 60 grams.

The product is a powerful, sensitive primary explosive which exists in the form of thin plate-like crystals of yellow color. Its explosion point is 264° C. and its static sensitivity is such that 5 out of 5 samples will fire only when exposed to the discharge of a 300 mmfd. capacitor charged to at least 4,000 volts.

The chemical composition is monobasic lead picrate·lead nitrate·lead hypophosphite·lead azide, and can be represented by the formula $$Pb(C_6H_2N_3O_7)_2 \cdot Pb(OH)_2 \cdot Pb(NO_3)_2 \cdot \tfrac{1}{2}Pb(H_2PO_2)_2 \cdot \tfrac{1}{2}Pb(N_3)_2$$

Other monobasic quadruple salts may be prepared in similar fashion by adding the requisite quantities of the appropriate radical for a fourth salt in the same way. Dibasic quadruple salts may be prepared by appropriate adjustment of the quantities of the reactants as in the following example:

*Example 29*

The quadruple salt, dibasic lead picrate·lead nitrate·lead acetate·lead hypophosphite may be prepared by the following procedure:

(1) Add 23.0 grams picric acid to 550 cc. water.

(2) Add 14.0 grams sodium acetate, 12.0 grams sodium hypophosphite and 17 to 19 grams sodium hydroxide to 50 cc. water.

(3) Combine 1 and 2 and raise temperature to 70 to 75° C.

(4) Add 220 grams lead nitrate to 600 cc. of water and, with stirring, add to 3.

(5) Maintain temperature noted above for 30 minutes. Continue stirring.

(6) Filter, wash with water, and dry the precipitate.
Yield: approximately 90.0 grams.

The product is a very sensitive powerful primary explosive. Its crystalline form is that of needles, and the color is yellow. Its explosion point is 282° C. and its static sensitivity is such that five out of five samples will fire only when exposed to the discharge of a 300 mmfd. capacitor charged to at least 1,000 volts.

The chemical composition is dibasic lead picrate·lead nitrate·lead acetate·lead hypophosphite, and can be represented by the formula $$Pb(C_6H_2N_3O_7)_2 \cdot 2Pb(OH)_2 \cdot 2Pb(NO_3)_2 \cdot Pb(C_2H_3O_2)_2 \cdot Pb(H_2PO_2)_2$$

Similar procedures are available for forming similar series of salts of tribasic lead picrate, as follows:

*Example 30*

The quadruple salt tribasic lead pictrate·lead nitrate·lead acetate·lead hypophosphite may be prepared by the following procedure:

(1) Add 23.0 grams picric acid to 950 cc. water.

(2) Add 18.0 grams sodium hypophosphite, 21.0 grams sodium acetate, and 25.5 to 28.5 grams sodium hydroxide to 50 cc. water.

(3) Combine 1 and 2 and raise temperature to 50 to 55° C.

(4) Add 330 grams lead nitrate to 1,000 cc. water and, with stirring, add to 3.

(5) Maintain temperature noted above for 30 minutes, and continue stirring.

(6) Filter, wash with water, and dry the precipitate.
Yield: Approximately 125 grams.

The product is a mild but very sensitive primary explosive. Its color is yellow, and in crystal structure it is needles. Its explosion point is 289° C. and its static sensitivity is such that 5 out of 5 samples will fire only when exposed to the discharge of a 300 mmfd. capacitor which has been charged to at least 4,000 volts.

The chemical composition is tribasic lead pictrate·lead nitrate·lead acetate·lead hypophosphite, and can be represented by the formula $$Pb(C_6H_2N_3O_7)_2 \cdot 3Pb(OH)_2 \cdot 3Pb(NO_3)_2 \cdot 1\tfrac{1}{2}Pb(C_2H_3O_2)_2 \cdot 1\tfrac{1}{2}Pb(H_2PO_2)_2$$

Other lead salts than lead nitrate may be used as combining and precipitating agents, as shown in the following examples:

*Example 31*

Monobasic lead pictrate·lead acetate·lead azide may be prepared by the following procedure:

| Solution Number | Solute | Quantity | Dissolved in— |
|---|---|---|---|
| I | Picric acid | 23.0 gms | 250 cc. H₂O. |
| II | Sodium hydroxide | 9.0 gms | 55 cc. H₂O. |
|   | Sodium azide | 7.0 gms |   |
| III | Lead acetate | 110 gms | 300 cc. H₂O. |

Add II to I with stirring. Raise temperature to 50–55° C. Add III over a 10 minute period. Hold for 30 minutes at 50–55° C. Filter, wash and dry.

Yield _____ 60 gms.
Explosion point, static sensitivity __ 300° C. on temperature gradient bar such that five out of five samles fire at 1500 v. from 300 mmfd. capacitor.
Crystal form _____ Yellow needles.
Properties _____ Powerful sensitive primary explosive.

The chemical composition is monobasic lead picrate·lead acetate·lead azide, and can be represented by the formula $$Pb(C_6H_2N_3O_7)_2 \cdot Pb(OH)_2 \cdot Pb(C_2H_3O_2)_2 \cdot Pb(N_3)_2$$

*Example 32*

Dibasic lead picrate·lead acetate·lead azide may be prepared by the following procedure:

| Solution Number | Solute | Quantity | Dissolved in— |
|---|---|---|---|
| I | Picric acid | 23.0 gms | 500 cc. H₂O. |
| II | Sodium hydroxide | 18.0 gms | 100 cc. H₂O. |
|   | Sodium azide | 14.0 gms |   |
| III | Lead acetate | 220 gms | 600 cc. H₂O. |

Add II to I with stirring. Raise temperature to 50–55° C. Add III over a 10 minute period. Hold at 50–55° C. for 30 minutes. Filter, wash and dry.

Yield _____ 96 gms.
Explosion point, static sensitivity __ 293° C. on temperature gradient bar such that samples would not fire at 4000 v. 300 mmfd. capacitor.
Crystal form _____ Yellow needles.
Properties _____ Weak senstitive primary explosive.

The chemical compostion is dibasic lead picrate·lead acetate·lead azide, and can be represented by the formula $$Pb(C_6H_2N_3O_7)_2 \cdot 2Pb(OH)_2 \cdot 2Pb(C_2H_3O_2)_2 \cdot 2Pb(N_3)_2$$

*Example 33*

Tribasic lead picrate·lead acetate·lead azide may be prepared by the following procedure:

| Solution Number | Solute | Quantity | Dissolved in— |
|---|---|---|---|
| I | Picric acid | 23.0 gms | 900 cc. H₂O. |
| II | {Sodium hydroxide | 27.0 gms | }100 cc. H₂O. |
|  | Sodium azide | 21.0 gms |  |
| III | Lead acetate | 330 gms | 1,000 cc. H₂O. |

Add II to I with stirring. Raise temperature to 50–55° C. Add III over a 10 minute period. Hold at 50–55° C. for 30 minutes. Filter, wash and dry.

Yield _____ 125 gms.
Explosion point, static sensitivity __ 295° C. on temperature gradient bar such that five out of five samples fire at 1000 v. from 300 mmfd. capacitor.
Crystal form _____ Yellow needles.
Properties _____ Powerful sensitive primary explosive.

The chemical compostion is tribasic lead picrate·lead acetate·lead azide, and can be represented by the formula:

$$Pb(C_6H_2N_3O_7)_2 \cdot 3Pb(OH)_2 \cdot 3Pb(C_2H_3O_2)_2 \cdot 3Pb(N_3)_2$$

*Example 34*

Monobasic lead picrate·lead lactate·lead azide may be prepared by the following procedure:

(1) Add 23.0 grams picric acid to 600 cc. water with stirring.
(2) Add 8.5 to 9.5 gms. of sodium hydroxide and 7.0 grams of sodium azide to 100 cc. of water stirring continuously.
(3) Mix the two solutions and raise the temperature to 50–55° C.
(4) With stirring, add a solution of 120 grams of lead lactate in 300 cc. of water to 3.
(5) Continue stirring for 30 minutes maintaining temperature.
(6) Filter, wash with water and dry.
Yield: Approximately 60 grams.

The product is a powerful primary explosive composed of well defined crystals of yellow fine needle form. Its explosion point is 280° C., and its static sensitivity is such that 5 of 5 fire when exposed to a discharge of a 300 mmfd. capacitor charged to 4000 volts.

The chemical composition is monobasic lead picrate·lead lactate·lead azide, and can be represented by the formula $$Pb(C_6H_2N_3O_7)_2 \cdot Pb(OH)_2 \cdot Pb(C_3H_5O_3)_2 \cdot Pb(N_3)_2$$

*Example 35*

Dibasic lead picrate·lead lactate·lead azide may be prepared by the following procedure:

(1) Add 23.0 grams picric acid to 600 cc. water with stirring.
(2) Add 17.0 to 19.0 grams of sodium hydroxide and 14.0 grams of sodium azide to 100 cc. of water with stirring continuously.
(3) Mix the two solutions and raise the temperature to 55° C.
(4) With stirring, add a solution of 240 grams of lead lactate in 600 cc. of water to 3.
(5) Continue stirring for 30 minutes maintaining temperature.
(6) Filter, wash with water and dry.
Yield: Approximately 90 grams.

The product is a powerful primary explosive composed of well defined crystals of yellow rectangular parallelopiped form. Its explosion point is 284° C. and its static sensitivity is such that 4 out of 5 fire when exposed to a discharge of a 300 mmfd. capacitor charged to 4000 volts.

The chemical composition is dibasic lead picrate·lead lactate·lead azide, and can be represented by the formula $$Pb(C_6H_2N_3O_7)_2 \cdot 2Pb(OH)_2 \cdot 2Pb(C_3H_5O_3)_2 \cdot 2Pb(N_3)_2$$

*Example 36*

Tribasic lead picrate·lead lactate·lead azide may be prepared by the following procedure:

(1) Add 23.0 grams picric acid to 1200 cc. water with stirring.
(2) Add 25.5 to 28.5 grams of sodium hydroxide and 21.0 grams of sodium azide to 150 cc. of water stirring continuously.
(3) Mix the two solutions and raise the temperature to 50–55° C.
(4) With stirring, add a solution of 360 grams of lead lactate in 1000 cc. of water to 3.
(5) Continue stirring for 30 minutes maintaining temperature.
(6) Filter, wash with water and dry.
Yield: approximately 120.0 grams.

The product is a weak primary explosive composed of well defined crystals of yellow rectangular parallelopiped form. Its explosion point is 280° C. and its static sensitivity is such that 0 out of 5 fire when exposed to a discharge of a 300 mmfd. capacitor charged to 4000 volts.

The chemical composition is tribasic lead picrate·lead lactate·lead azide, and can be represented by the formula $$Pb(C_6H_2N_3O_7)_2 \cdot 3Pb(OH)_2 \cdot 3Pb(C_3H_5O_3)_2 \cdot 3Pb(N_3)_2$$

*Example 37*

Monobasic lead picrate·lead acrylate·lead azide may be prepared by the following procedure:

(1) Add 23.0 grams picric acid to 600 cc. water with stirring.
(2) Add 8.5 to 9.5 grams of sodium hydroxide and 7.0 grams of sodium azide to 100 cc. of water stirring continuously.
(3) Mix the two solutions and raise the temperature to 50–55° C.
(4) With stirring, add 110 grams of dry lead acrylate to 3.
(5) Continue stirring for 30 minutes maintaining temperature.
(6) Filter, wash with water and dry.
Yield: approximately 60 grams.

The product is a powerful primary explosive composed of well defined crystals of yellow needle form. Its explosion point is 285° C., and its static sensitivity is such that 5 of 5 fire when exposed to a discharge of a 300 mmfd. capacitor charged to 1000 volts.

The chemical composition is monobasic lead picrate·lead acrylate·lead azide, and can be represented by the formula $$Pb(C_6H_2N_3O_7)_2 \cdot Pb(OH)_2 \cdot Pb(C_3H_3O_2)_2 \cdot Pb(N_3)_2$$

*Example 38*

Dibasic lead picrate·lead acrylate·lead azide may be prepared by the following procedure:

(1) Add 23.0 grams picric acid to 1000 cc. water with stirring.
(2) Add 17.0 to 19.0 grams of sodium hydroxide and 14.0 grams of sodium azide to 150 cc. of water stirring continuously.
(3) Mix the two solutions and raise the temperature to 50–55° C.
(4) With stirring, add 220 grams of dry lead acrylate to 3.
(5) Continue stirring for 30 minutes maintaining temperature.
(6) Filter, wash with water and dry.
Yield: approximately 95 grams.

The product is a powerful primary explosive composed of well defined crystals of fine yellow needle form. Its explosion point is 273° C., and its static sensitivity is such that 5 of 5 fire when exposed to a discharge of a 300 mmfd. capacitor charged to 1000 volts.

The chemical composition is dibasic lead picrate·lead acrylate·lead azide, and can be represented by the formula

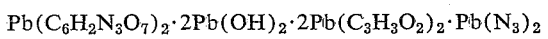
$$Pb(C_6H_2N_3O_7)_2 \cdot 2Pb(OH)_2 \cdot 2Pb(C_3H_3O_2)_2 \cdot Pb(N_3)_2$$

*Example 39*

Tribasic lead picrate·lead acrylate·lead azide may be prepared by the following procedure:

(1) Add 23.0 grams picric acid to 2000 cc. water with stirring.
(2) Add 25.5 to 28.5 grams of sodium hydroxide and 21.0 grams of sodium azide to 200 cc. of water stirring continuously.
(3) Mix the two solutions and raise the temperature to 50–55° C.
(4) With stirring, add 330 grams of dry lead acrylate to 3.
(5) Continue stirring for 30 minutes maintaining temperature.
(6) Filter, wash with water and dry.
Yield: approximately 120 grams.

The product is a powerful primary explosive composed of well defined crystals of yellow fine needle form. Its explosion point is 283° C., and its static sensitivity is such that 5 of 5 fire when exposed to a discharge of a 300 mmfd. capacitor charged to 1000 volts.

The chemical composition is tribasic lead picrate·lead acrylate·lead azide, and can be represented by the formula $$Pb(C_6H_2N_3O_7)_2 \cdot 3Pb(OH)_2 \cdot 3Pb(C_3H_3O_2)_2 \cdot 3Pb(N_3)_2$$

*Example 40*

Monobasic lead picrate·lead methacrylate·lead azide may be prepared by the following procedure:

(1) Add 23.0 grams picric acid to 600 cc. water with stirring.
(2) Add 8.5 to 9.5 grams of sodium hydroxide and 7.0 grams of sodium azide to 50 cc. of water stirring continuously.
(3) Mix the two solutions and raise the temperature to 55° C.
(4) With stirring, add 115 grams of dry lead methacrylate to 3.
(5) Continue stirring for 30 minutes maintaining temperature.
(6) Filter, wash with water and dry.
Yield: approximately 60 grams.

The product is a very powerful primary explosive composed of well defined crystals of yellow needle form. Its explosion point is 276° C., and its static sensitivity is such that 5 out of 5 fire when exposed to a discharge of a 300 mmfd. capacitor charged to 1000 volts.

The chemical composition is monobasic lead picrate·lead methacrylate·lead azide, and can be represented by the formula

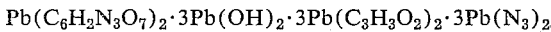
$$Pb(C_6H_2N_3O_7)_2 \cdot Pb(OH)_2 \cdot Pb(C_4H_5O_2)_2 \cdot Pb(N_3)_2$$

*Example 41*

Dibasic lead picrate·lead methacrylate·lead azide may be prepared by the following procedure:

(1) Add 23.0 grams picric acid to 1200 cc. water with stirring.
(2) Add 17.0 to 19.0 grams of sodium hydroxide and 14.0 grams of sodium azide to 100 cc. of water stirring continuously.
(3) Mix the two solutions and raise the temperature to 55° C.
(4) With stirring, add 230 grams of dry lead methacrylate to 3.
(5) Continue stirring for 30 minutes maintaining temperature.
(6) Filter, wash with water and dry.
Yield: approximately 90 grams.

The product is a very weak primary explosive composed of well defined crystals of yellow needle form. Its explosion point is 270° C., and its static sensitivity is such that 1 out of 5 fire when exposed to a discharge of a 300 mmfd. capacitor charged to 4000 volts.

The chemical composition is dibasic lead picrate·lead methacrylate·lead azide and can be represented by the formula

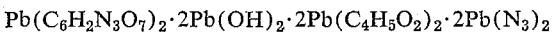
$$Pb(C_6H_2N_3O_7)_2 \cdot 2Pb(OH)_2 \cdot 2Pb(C_4H_5O_2)_2 \cdot 2Pb(N_3)_2$$

*Example 42*

Monobasic lead picrate·lead propionate·lead azide may be prepared by the following procedure:

| Solution Number | Solute | Quantity | Dissolved in— |
|---|---|---|---|
| I | Picric acid | 23.0 gms. | 250 cc. H₂O. |
| II | Sodium hydroxide | 9.0 gms. | 50 cc. H₂O. |
|    | Sodium azide | 7.0 gms. |  |
| III | Lead propionate | 110 gms. | 300 cc. H₂O. |

Add II to I with stirring. Raise temperature to 50–55° C. Add III over a period of 10 minutes. Hold at 50–55° C. for 30 minutes. Filter, wash and dry.

Yield _____ 60 gms.
Explosion point, static sensitivity _ 300° C. on temperature gradient bar such that five out of five samples fire at 1500 v. from 300 mmfd. capacitor.
Crystal form _____ Yellow needles.
Properties _____ Very powerful primary explosive.

The chemical composition is monobasic lead picrate·lead propionate·lead azide, and can be represented by the formula $$Pb(C_6H_2N_3O_7)_2 \cdot Pb(OH)_2 \cdot Pb(C_3H_5O_2)_2 \cdot Pb(N_3)_2$$

*Example 43*

Dibasic lead picrate·lead propionate·lead azide may be prepared by the following procedure:

| Solution Number | Solute | Quantity | Dissolved in— |
|---|---|---|---|
| I | Picric acid | 23.0 gms. | 500 cc. H₂O. |
| II | Sodium hydroxide | 18.0 gms. | 100 cc. H₂O. |
|    | Sodium azide | 14.0 gms. |  |
| III | Lead propionate | 220 gms. | 600 cc. H₂O. |

Add II to I with stirring. Raise temperature to 50–

55° C. Add III over a 10 minute period. Hold to 50–55° C. for 30 minutes. Filter, wash and dry.

Yield _____ 90 gms.
Explosion point, static sensitivity __ 297° C. on temperature gradient bar such that five out of five samples fire at 1000 v. from 300 mmfd. capacitor.
Crystal form _____ Yellow needles.
Properties _____ Powerful primary explosive.

The chemical composition is dibasic lead picrate·lead propionate·lead azide, and can be represented by the formula $$Pb(C_6H_2N_3O_7)_2 \cdot 2Pb(OH)_2 \cdot 2Pb(C_3H_5O_2)_2 \cdot 2Pb(N_3)_2$$

*Example 44*

Monobasic lead picrate·lead formate·lead azide may be prepared by the following procedure:

| Solution Number | Solute | Quantity | Dissolved in— |
|---|---|---|---|
| I | Picric acid | 23.0 gms | 550 cc. H$_2$O. |
| II | {Sodium hydroxide | 9.0 gms | |
|    | {Sodium azide | 7.0 gms | |
| III | Lead formate (dry powder). | 100 gms | |

Add II to I with stirring. Raise temperature to 70–75° C. Add III (dry powder) over a 15 minute period. Hold at 70–75° C. for 60 minutes. Filter, wash and dry.

Yield _____ 53 gms.
Explosion point, static sensitivity __ 275° C. on temperature gradient bar such that five out of five samples fire at 1000 v. from 300 mmfd. capacitor.
Crystal form _____ Yellow needles.
Properties _____ Powerful sensitive primary exposive.

The chemical composition is monobasic lead picrate·lead formate·lead azide, and can be represented by the formula $$Pb(C_6H_2N_3O_7)_2 \cdot Pb(OH)_2 \cdot Pb(HCO_2)_2 \cdot Pb(N_3)_2$$

The examples listed above are intended as illustrative and not as limited or indicative that only these specific explosives can be formed. It will be noted that each of the specific examples produces a sensitive primary explosive which is a triple or quadruple salt of basic lead picrate in the form of a complex clathrate inclusion compound combining in the complex crystals one or two lead salts of a monobasic acid of no greater strength than picric acid, which monobasic acid is also one forming soluble sodium salts by which it may be introduced into the reaction and another lead salt of a monobasic acid which is introduced into the reaction as a combining and precipitating agent in the form of a lead salt which is by itself more soluble than the complex clathrate inclusion salt which is precipitated as the end product of the reaction. Solubility to such an extent that one part of the lead salt can be dissolved in one hundred parts of water is sufficient for such a combining and precipitating agent.

Considering the various specific examples, it will be seen that essentially identical process are utilized to produce each of the explosives. Comparison is facilitated by the fact that all of the laboratory scale specific examples outlined start with the same quantity of picric acid.

It will be seen that each of the processes requires adding the desired amount of picric acid to water, where the picric acid will in part dissolve and in part may be kept in suspension by continued stirring.

To the picric acid in water there is added, for each gram mole of picric acid, in excess of 2 gram moles of sodium hydroxide and in excess of 1 gram mole of one or more monovalent sodium salts of monobasic acids of no greater acid strength than picric acid. Note that, as these solutions are mixed and the temperature raised, certain reactions take place which result in clarification of the solution and in the temporary appearance of an unidentified precipitate which in part dissolves as heating and stirring continue.

To the solution formed above there is added, with continued heat and stirring, for each gram mole of picric acid, in excess of three gram moles of a lead salt of a monobasic acid, which lead salt is, under the conditions of the reaction, more soluble than the complex salt which it is desired to precipitate. This lead salt reacts with the solution and results in the formation of a complex salt which is insoluble in the solution in which it is formed and is precipitated therefrom. As noted before, this combining and precipitating lead salt should be soluble at least to the extent that one part may be dissolved in one hundred parts of water.

The precipitate may then be washed and dried.

As indicated, the specific examples, in general, employ the identical method. The reaction generally proceeds faster and to a greater degree of completeness if all reactants but picric acid are present in slightly greater amounts than theoretically necessary. If the excess is only slightly more than that indicated above and only one sodium salt is used a monobasic triple salt will be precipitated. The use of slightly in excess of double or triple the proportions of all of the reactants except picric acid will result, respectively, in the precipitation of dibasic and tribasic triple salts.

If the indicated proportion of sodium salt is shared on a 50/50 gram mole basic between two different sodium salts, a monobasic quadruple salt will be formed. Here also, doubling and tripling the proportions of all of the reactants except picric acid will result, respectively, in the precipitation of dibasic quadruple salts and tribasic quadruple salts.

In some instances a sodium salt of the desired acid may not be readily commercially available. In such cases, I prefer to use what would otherwise be an excessive amount of sodium hydroxide and, by reacting the particular acid therewith, form the sodium salt in the solution prior to the addition of the combining and precipitating lead salt. For example, it is convenient to so use glycolic, lactic, amono-acetic, acrylic, methacrylic, and butyric acids, since the sodium salts of these acids are not readily commercially available.

Similarly, it may be noted that in some instances I have preferred to add the combining and precipitating lead salt as a dry powder, rather than as a water solution. In these cases, the lead salt is one which would be completely soluble only in an inconveniently large volume of water and in such a dilute solution the reaction might proceed too slowly. However, the dry powder is more soluble under the conditions in which the reaction is proceeding than the complex salt to be precipitated, and, with heat and stirring of the solution, the reaction proceeds and the complex salt is precipitated. Examples of lead salts which are best added in the dry powder form are the acrylate, methacrylate and formate. Bearing in mind the previously mentioned criteria of a solubility of one part per hundred parts water for suitability for use in the reaction, it appears to be preferable to add as dry powders those lead salts which are less soluble than about one part lead salt in fifteen parts water.

Although the final step in each of the specific examples has been indicated as washing and drying the precipitate, it should be noted that all of these are sensitive primary explosives. Thus, if they are to be stored for any significant period of time or in substantial quantity, it is preferable that they be stored wet. If maintained wet with 25% or more of water they are relatively safe to handle and store, since they are then quite insensitive to the effects of shock, friction, fire, detonation or electrostatic discharge. For example, the triple salt monobasic lead picrate·lead nitrate·lead acetate will not even react to such potent stimuli as the detonation of a No. 8 blasting cap buried in a mass of the material wet with 25% water. The complex salts are only slightly soluble in water and, since the ordinarily more soluble constituent lead salts are bound up in the crystalline structure of the complex clathrate salt, the explosives may be repeatedly washed, stored wet, and dried for use without change in proportions, composition, or explosive properties.

The formulas shown are not intended to indicate or infer that a definite structural formula has been or can be written for any of these salt complexes, for, as has been noted, such compounds appear to disdain the normal types of chemical bonding. Ultimate elemental chemical analyses of the complex salts resulting are in close agreement with the indicated formulas and with the quantities of the materials used to produce the complex salts, so that the indicated formulas accurately represent the relative proportions of the molecules included.

That these products are triple and quadruple complex clathrate inclusion salts, rather than mixtures, is indicated by the following: The procedures set forth are invariably reproducible under varying conditions and with various quantities of the material in accordance with the law of definite proportions. As in the case of all exploratory work in the field of primary explosives, routine safety precautions demanded that the initial work be done with minute quantities of material. Each of the procedures here disclosed has been successfully scaled up to the laboratory size batches outlined in the specific examples and is similarly reproducible in production lots of many pounds, as shown for example in Example 1a.

By visual observation and by study of photomicrographs in color of the complex clathrate inclusion salt crystals produced, it has been determined that each of the specific examples precipitates in a characteristic crystal form. It may be noted that the lead salts, other than lead picrate, which are involved in the complex crystals are by themselves almost all white or colorless powders of amorphous or fine crystalline form. Close visual or microscopic examination of the complex salt crystals fails to reveal any trace of any material corresponding to these white or colorless crystalline forms, yet elemental chemical analysis confirms that they are present in the complex crystals and that the equivalent amount of material has been removed from the solution from which the crystals of the complex salt have been precipitated.

With each specific example the explosive properties of the particular complex clathrate inclusion salt have been listed. Except for the fact that all are relatively sensitive primary explosives, their explosion points on a temperature gradient bar, sensitivity to static electricity and explosive power vary from one example to the next but are reproducibly characteristic of the particular explosive complex clathrate inclusion salt.

That these are complex clathrate inclusion salts, rather than mixtures, is further revealed by a comparison of solubility data. It will be recalled that in each example the complex clathrate inclusion salt crystals which are the end product are precipitated out of the solution when the combining and precipitating lead salt is added. In all cases this combining and precipitating salt is, at the temperature of the solution, more soluble than the precipitated complex clathrate inclusion salt and in most cases the combining and precipitating salt is very readily soluble. Consider, for example, the triple salt monobasic lead picrate·lead nitrate·lead acetate. Lead nitrate and lead acetate are both readily soluble in water at a temperature of 70° to 75° C., and yet they are precipitated as part of the complex salt. If the end product was only a mixture these substances would remain in solution or would have been separately precipitated in their own characteristic crystal forms. Further, as pointed out in the specific examples, the final processing step includes filtering and washing with water, which does not leach out these readily soluble lead salts or lead to variation in composition which would otherwise result from minor differences in time, temperature or other washing conditions. Further, the explosives of this invention are for the sake of safety usually stored wet, in which condition they are quite completely insensitive. The complex salt explosives of this invention can be stored, wet with water, for indefinite periods of time without leaching out any of the lead salts which if not part of the complex salt crystals would be so readily soluble. Neither is there any tendency for these lead salts to segregate on the surface or elsewhere in the product as would be the case if these soluble lead salts were only present as part of a mechanical mixture.

Further, the complex salts which are the product of this invention have been studied by X-ray diffractometric methods. The figures of the drawing are reproductions of charts resulting from X-ray diffractometer runs on exemplary double, triple and quadruple complex salts of basic lead picrate with similar charts for mixtures of the component salts and for the possible combinations of component salts. In comparing this diffractometer data, it should be noted that all of the charts relate to runs at the same speed of rotation and that the horizontal scales of degrees rotation are directly comparable although height of peaks or intensity values may vary slightly under different recording conditions. As those skilled in the art will realize, the points of difference in the degrees displacement of the peaks in the X-ray data are positive proof that there are differences in composition and crystalline form of the compounds compared by X-ray. Reference may be had to the following quotation from volume 14 of the McGraw-Hill Encyclopedia of Science and Technology:

"X-ray powder methods

Physical techniques used for the identification of substances and for other types of analyses, principally for crystalline materials in the solid state. In these techniques, a small collimated beam of nearly monochromatic X-rays is directed onto a small polycrystalline specimen in the form of powder, producing a diffraction pattern that is recorded on film or with a counter tube. This X-ray pattern is a fundamental and uniquely characteristic property resulting from the atomic arrangement of the diffracting substance. Different substances have different atomic arrangements or crystal structures, and hence no two chemically distinct substances give identical diffraction patterns. Identification may be made by comparing the pattern of the unknown substance with patterns of known substances, in a manner somewhat analogous to the identification of persons by their fingerprints. The analytical information is different from that obtained by chemical or spectrographic analysis. X-ray identification of chemical compounds indicates the constituent elements, and shows how they are combined.

The X-ray powder method is widely used in fundamental and applied research; for instance, it is used in the analysis of raw materials and finished products; in phase diagram investigations, in following the course of solid-state chemical reactions, and in the study of minerals, ores, rocks, metals, chemicals, and many other types of material. The use of powder methods to determine the actual atomic arrangement, which has been so important in the study of chemical bonds, crystal physics, and crystal chemistry, is described in related articles. See X-ray crystallography; X-ray diffraction; X-ray fluorescence analysis."

Although the illustrations could be multiplied almost ad infinitum, it is believed sufficient to illustrate here only a few exemplary materials.

Thus, FIGURE 1 presents the X-ray diffractometer chart of the complex salt of Example 1, monobasic lead picrate·lead nitrate·lead acetate. This should be compared first with FIG. 2 which is an X-ray diffractometer chart of a mechanical mixture containing identical proportions of lead picrate, lead hydroxide, lead nitrate, and lead acetate.

Figure 3:
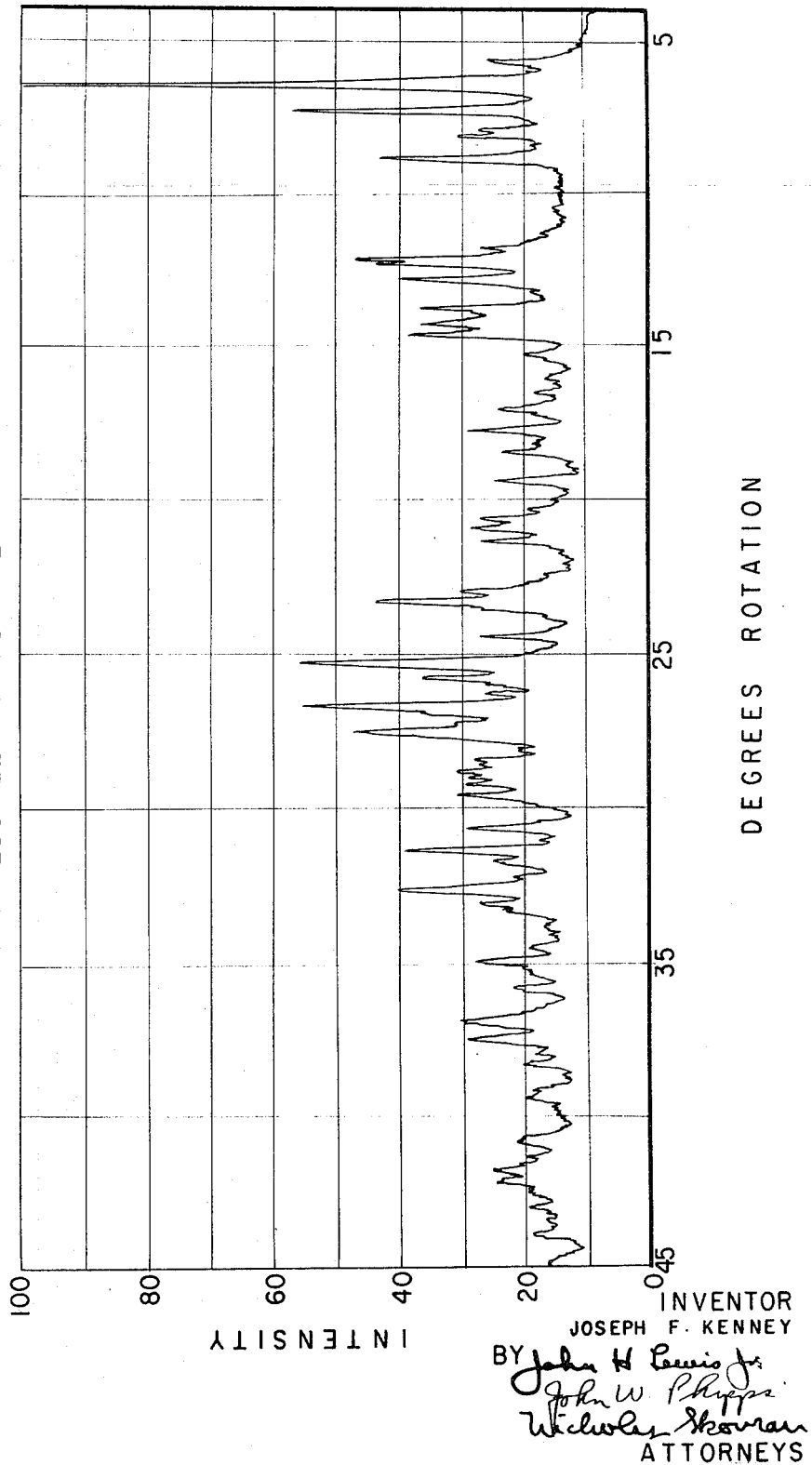
Figure 4:
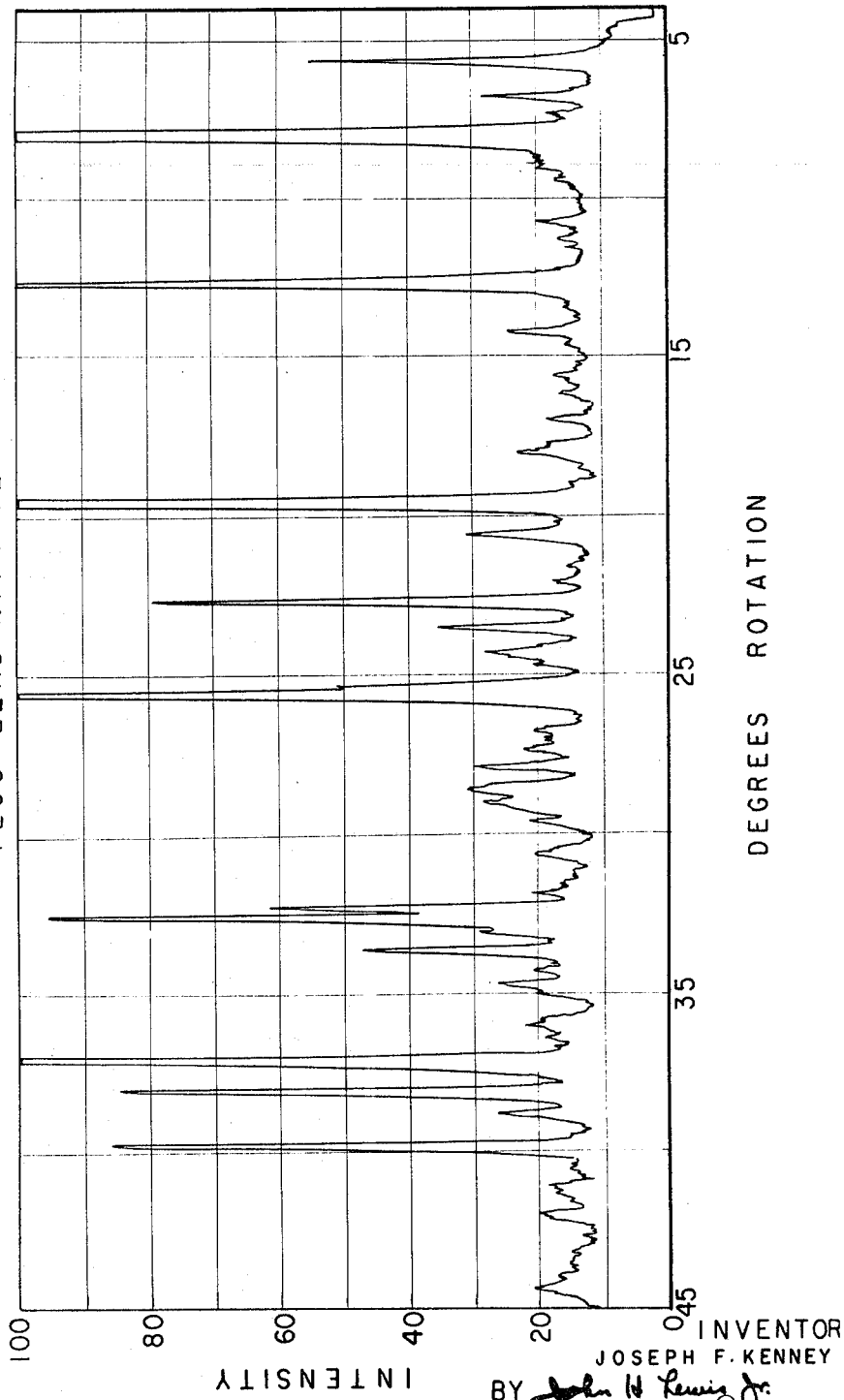

Since someone unfamiliar with the facts might also hypothesize that the triple salt of Example 1 was only a mechanical mixture of certain lead salts, FIGURE 3 presents for comparison purposes an X-ray diffractometer chart for a mechanical mixture of lead nitrate with the double salt basic lead picrate·lead acetate. FIGURE 4 presents similarly the X-ray diffractometer chart for a mechanical mixture of lead acetate with the double salt basic lead picrate·lead nitrate. Again, the proportions of lead picrate, lead hydroxide, lead nitrate and lead acetate are the same as those existing in the triple salt of Example 1.

Figure 6:
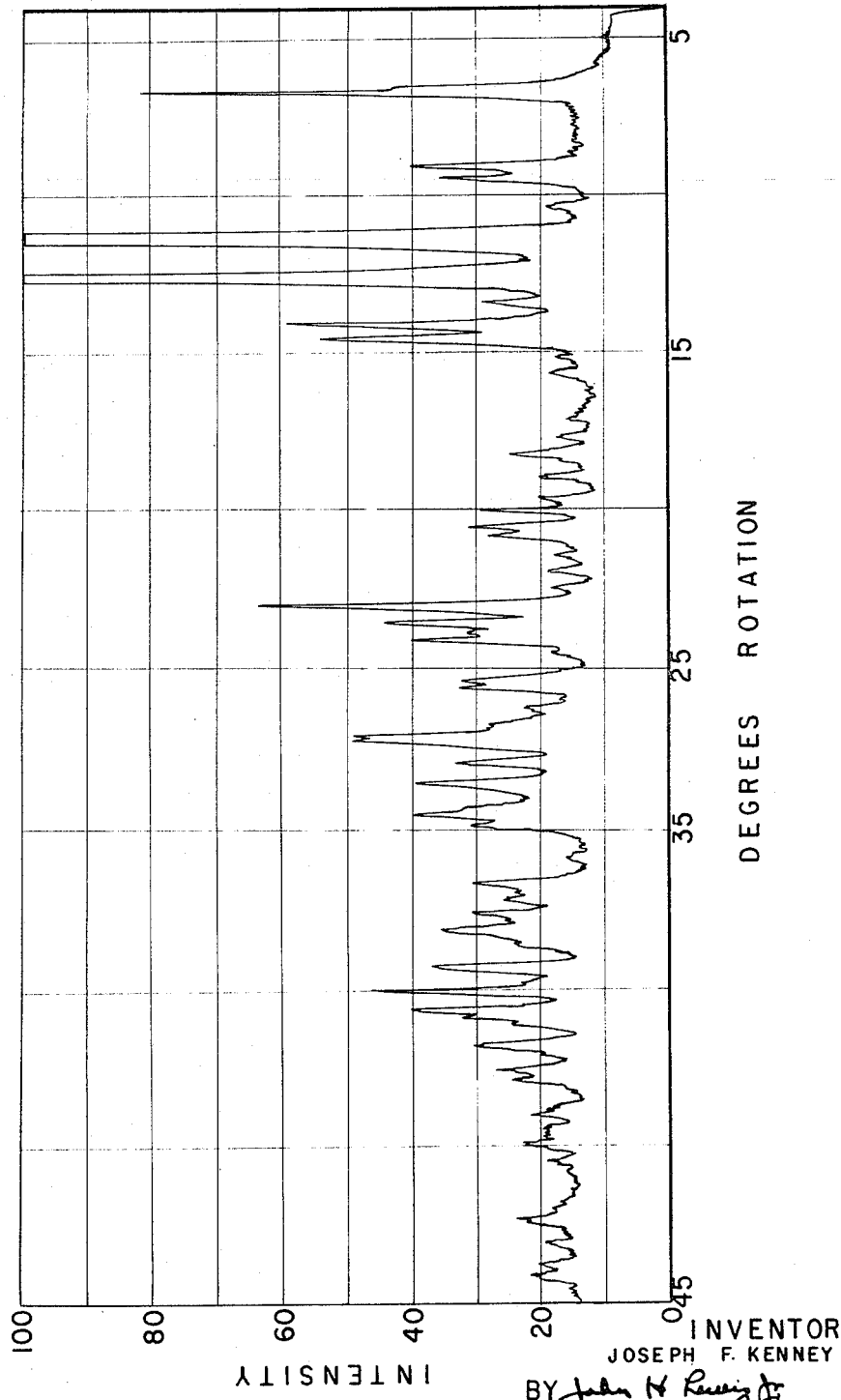
Figure 7:
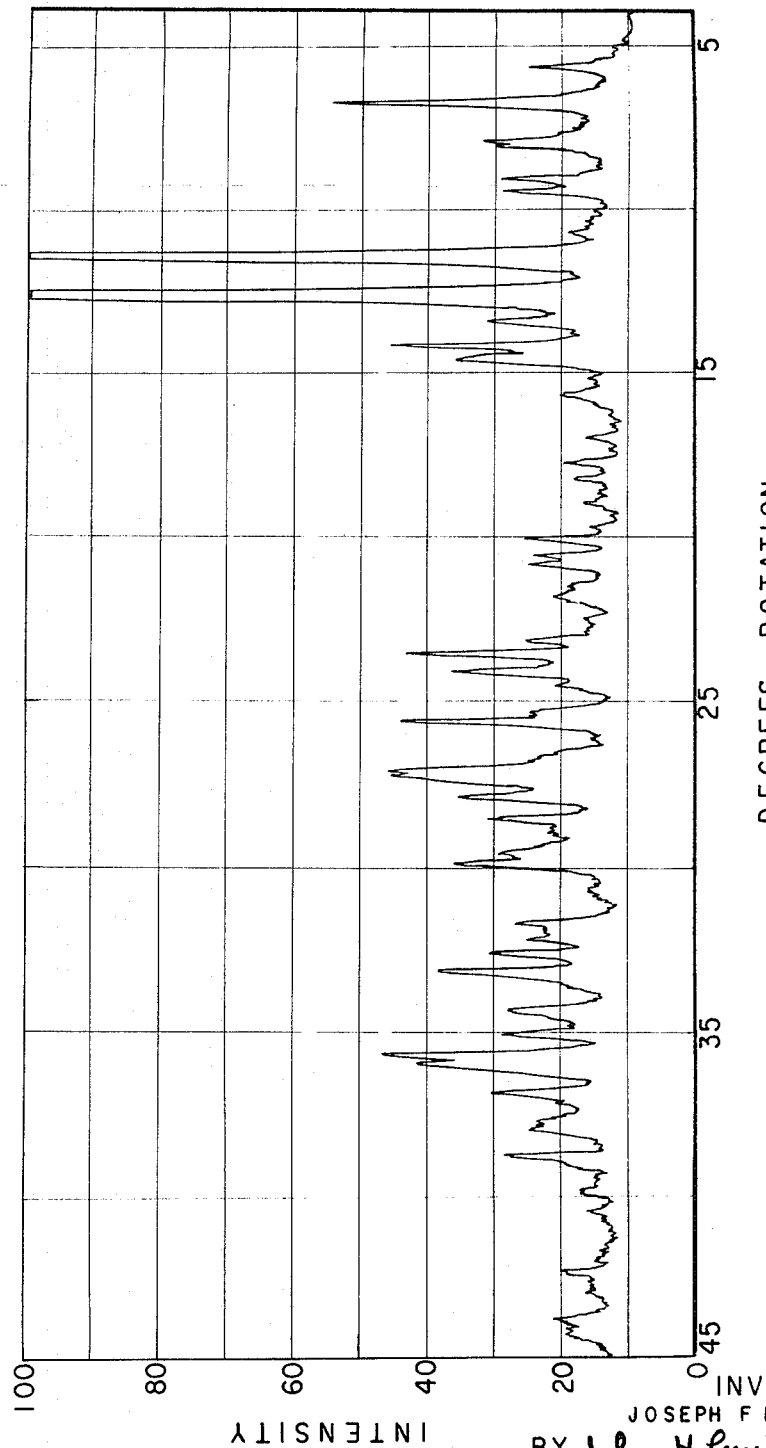
Figure 8:
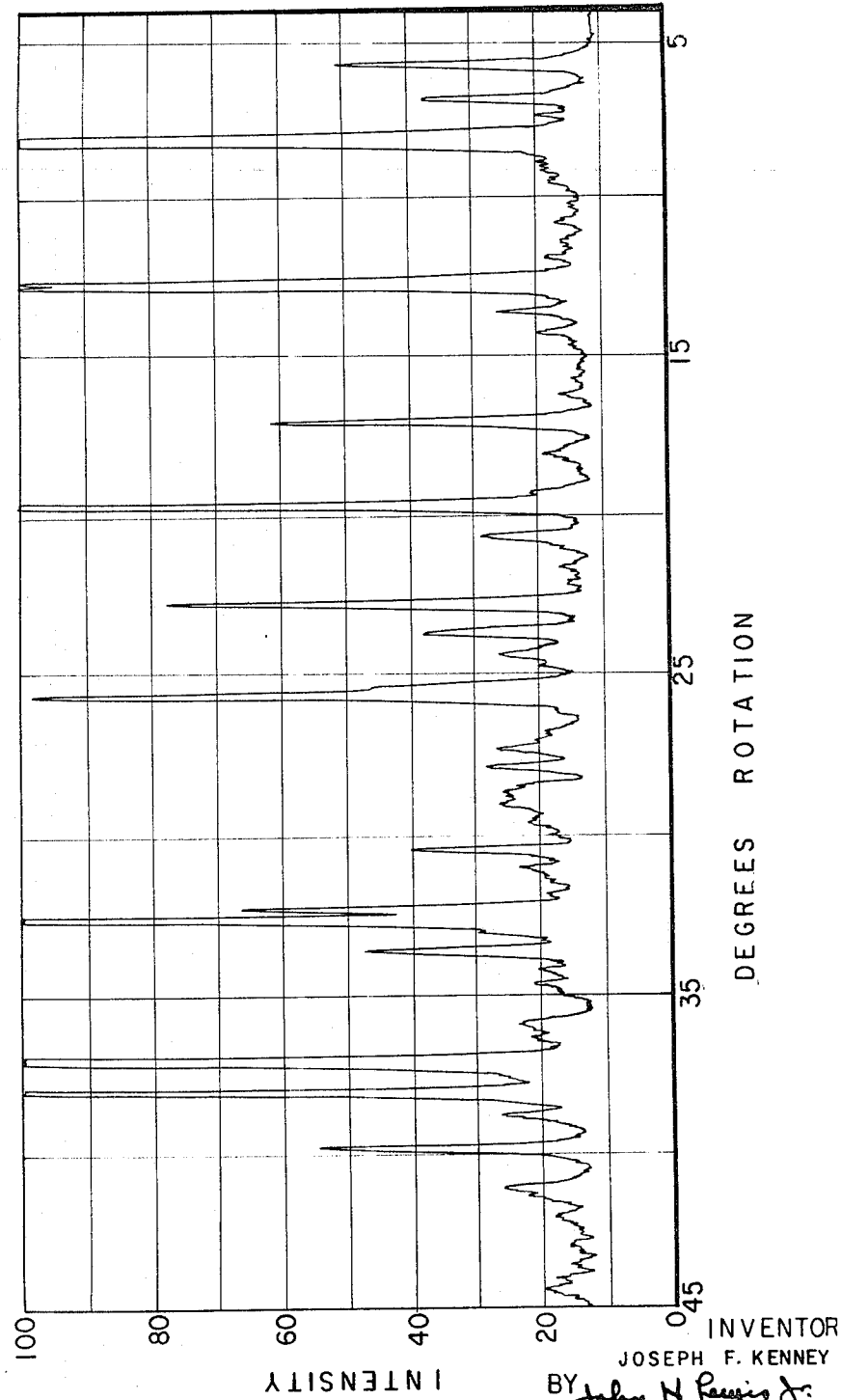
Figure 9:
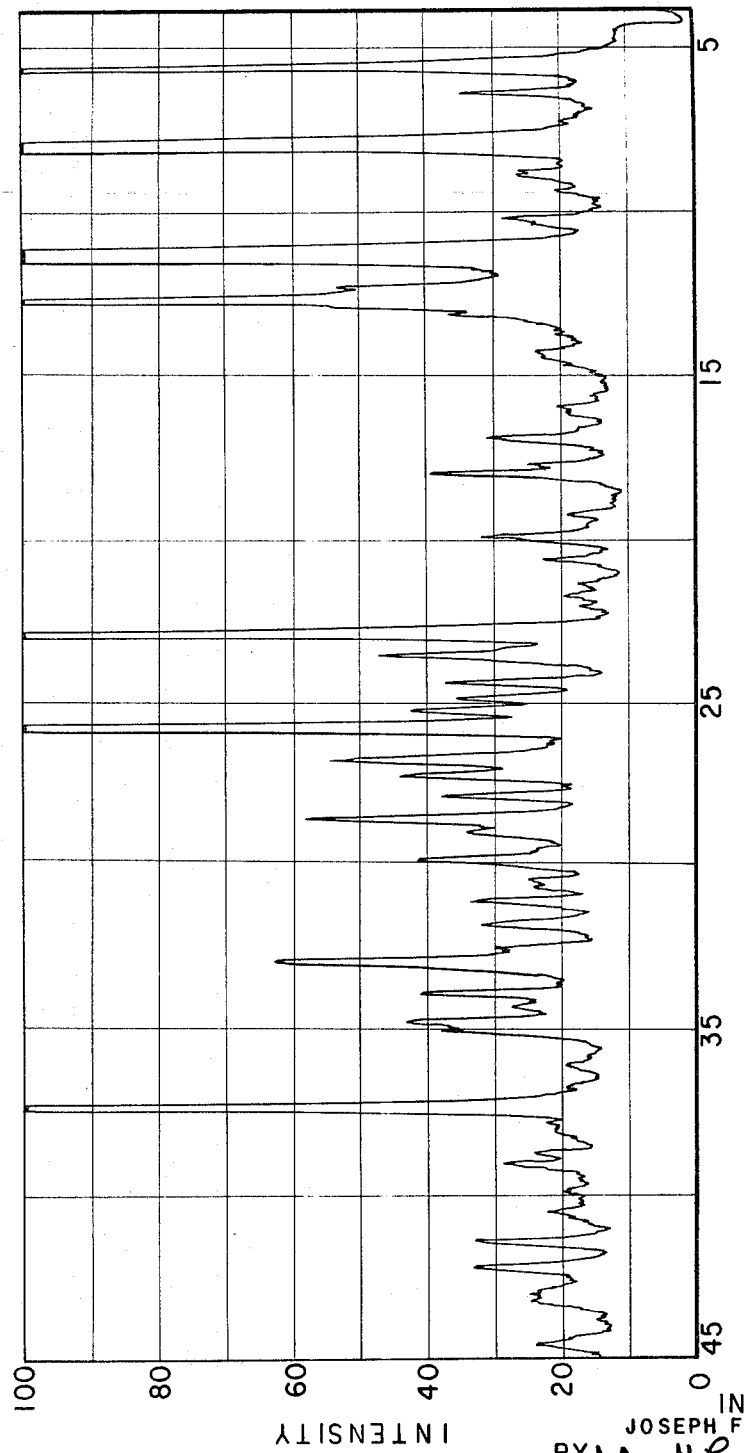
Figure 10:
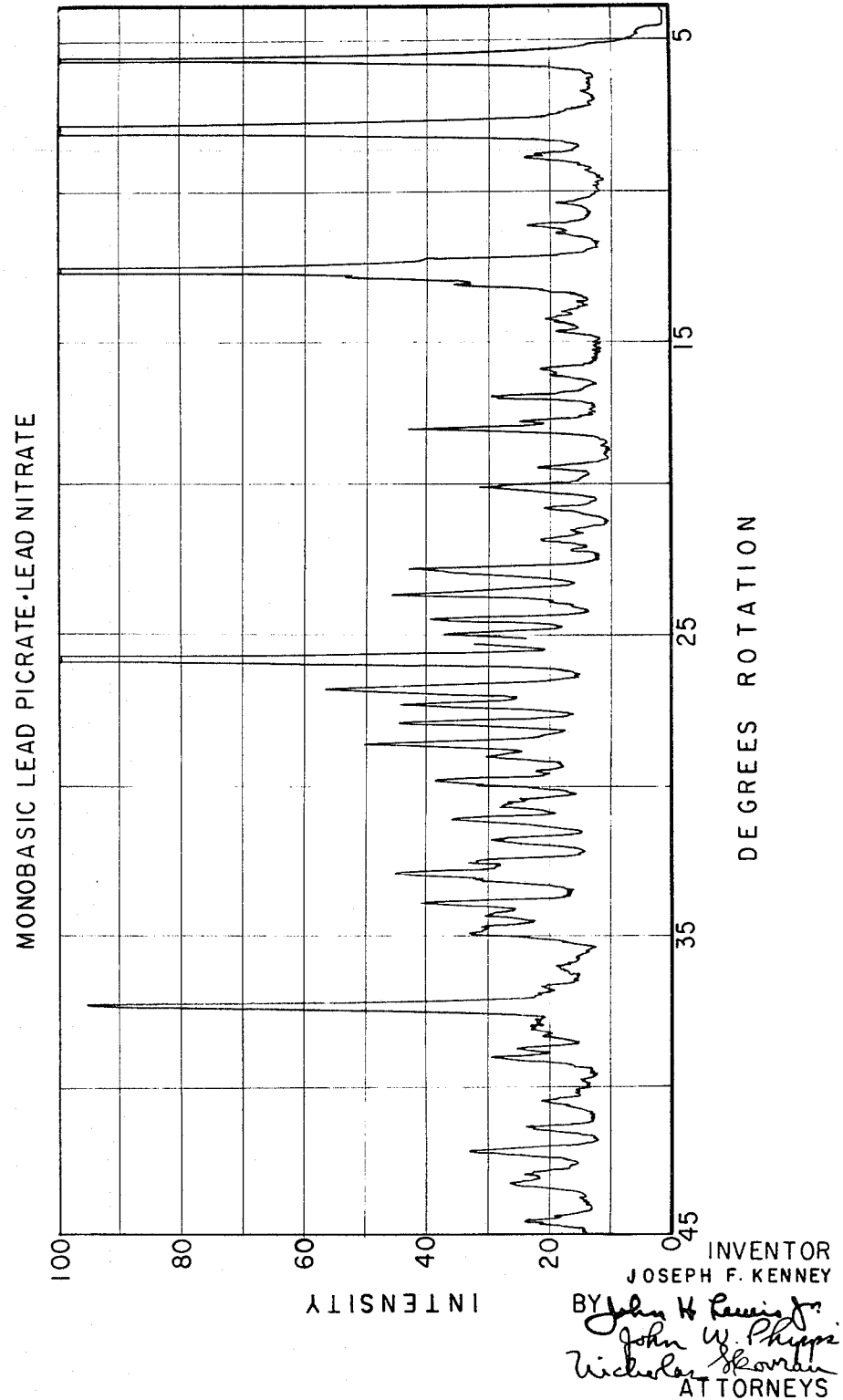

For further comparison, FIGURE 5 presents the X-ray diffractometer data for the quadruple salt of Example 27, monobasic lead picrate·lead nitrate·lead acetate·lead hypophosphite. FIGURE 6 presents a similar chart for a mechanical mixture containing identical proportions of lead picrate, lead hydroxide, lead nitrate, lead acetate, and lead hypophosphite. FIGURE 7 presents a similar chart for a mechanical mixture of lead hypophosphite with the triple salt basic lead picrate·lead nitrate·lead acetate; while FIGURES 8 and 9, respectively, present such data respectively for a mechanical mixture of lead nitrate and lead hypophosphite with the double salt basic lead picrate·lead acetate and a mechanical mixture of lead acetate and lead hypophosphite with the double salt basic lead picrate·lead nitrate. In FIGURES 7, 8 and 9 the proportions of the ingredients of the mixtures is identical to that in FIGURES 5 and 6 and in Example 27.

For further comparisons, FIGURES 10 through 16 present, as tabulated below, the X-ray diffractometer data secured from runs with various salts shown above as components of the various mixtures which have been compared with the triple and quadruple complex clathrate inclusion salts of this invention.

| Figure: | Compound |
|---|---|
| 10 | monobasic lead picrate·lead nitrate |
| 11 | monobasic lead picrate·lead acetate |
| 12 | normal lead picrate |
| 13 | lead hydroxide |
| 14 | lead nitrate |
| 15 | lead acetate |
| 16 | lead hypophosphite |

Since FIGURES 1 and 5 show some peaks in common with FIGURE 11 it is apparent that monobasic lead picrate·lead acetate is present in the explosives of Examples 1 and 27 and is the host material for these clathrate inclusion compounds. However, since the indications are that monobasic lead picrate·lead acetate is itself a clathrate type compound, and since I have been unable to prepare any less complex form of basic lead picrate, I cannot completely define the crystalline structure of these complexes.

In view of the clarity with which the figures and other data referred to above demonstrate that the products of this invention are truly complex clathrate inclusion salts, and not mere mechanical mixtures of the various component salts, it is believed to be unnecessary to encumber the specification and drawing with further illustrations of X-ray data.

All of these are explosives of the type which are useful as replacements for lead styphnate and similar explosives in ammunition priming mixtures, blasting caps, electric match heads, and the like. Monobasic lead picrate·lead nitrate·lead acetate (Example 1a) appears to have the best combination of properties for small arms ammunition primers. These properties are: ease of manufacture and handling, powder igniting ability, percussion sensitivity and safety in handling. Others which gave satisfactory results in ammunition primers are monobasic lead picrate·lead nitrate·lead hypophosphite (Example 1b) and monobasic lead picrate·lead nitrate·lead hypophosphite·lead acetate (Example 2a). Of the others, the more powerful explosives should be suitable for the main charges in blasting caps while the less powerful materials have properties suitable for electric match heads, squibs and intermediate charges in blasting caps and other explosive devices.

As previously noted, monobasic lead picrate·lead nitrate·lead acetate appears to have the best character-

TABLE II$_A$

RIM FIRE PRIMING COMPOSITIONS

[Mean Firing Height (2 oz. wt.) 6″ to 8″]

| | Range | Typical | | | | | | | | | | | | | Preferred |
|---|---|---|---|---|---|---|---|---|---|---|---|---|---|---|---|
| Monobasic Lead Picrate·Lead Nitrate·Lead Acetate | 36–50 | 36 | 36 | 46 | 38 | 46 | 46 | 46 | 46 | 42 | 43 | 46 | 38 | 50 | 48 | [1] 46 |
| Tetracene | 2–5 | 4 | 4 | 4 | 4 | 4 | 4 | 4 | 4 | 4 | 4 | 4 | 4 | 4 | 4 | 4 |
| Normal Lead Styphanate | 0–10 | 10 | | | | | | | | | | | | | | |
| Potassium Lead Styphnate·Lead Hypophosphite | 0–10 | | 10 | | | | | | | | | | | | | |
| Oxidizer | 33–58 | | | | | | | | | | | | | | | |
| which may be | | | | | | | | | | | | | | | | |
| Barium Nitrate | 0–58 | 50 | 50 | | | 40 | 40 | 40 | 45 | 50 | 48 | 45 | 58 | 46 | 48 | 50 |
| or | | | | | | | | | | | | | | | | |
| Lead Nitrate | 0–50 | | | 50 | 33 | | | | | | | | | | | |
| Basic Lead Nitrate | 0–10 | | | | | 10 | | | | | | | | | | |
| Lead Dioxide | 0–10 | | | | | | 10 | | | | | | | | | |
| Lead Thiocyanate | 0–10 | | | | | | | 10 | | | | | | | | |
| Boron | 0–5 | | | | | | | | 5 | | | | | | | |
| Antimony Sulfide | 0–5 | | | | | | | | | 4 | 5 | 5 | | | | |
| Glass | 0–33 | | | | 25 | | | | | | | | | | | |
| Monobasic Lead Picrate·Lead Nitrate·Lead Hypophosphite | | 46 | | | | | | | | | | | | | | |
| Dibasic Lead Picrate·Lead Nitrate·Lead Acetate | | | 46 | 70 | | | | | | | | | | | | |
| Monobasic Lead Picrate·Lead Nitrate·Lead Acetate·Lead Hypophosphite | | | | | 46 | 50 | 46 | | | | | | | | | |
| Tetracene | | 4 | 4 | 4 | 5 | 4 | 4 | | | | | | | | | |
| Barium Nitrate | | 50 | 50 | 25 | 50 | 46 | | | | | | | | | | |
| Lead Nitrate | | | | | | | 40 | | | | | | | | | |
| Basic Lead Nitrate | | | | | | | 10 | | | | | | | | | |

[1] P–85.

istics for use in small arms ammunition priming mixtures. This has been evaluated in priming mixtures for rimfire cartridges in the proportions and with the ingredients as shown in Table IIA appearing below. The preferred mixture when tested in rimfire shells with a 2 oz. falling weight shows an average firing point of 6.36 inches with a standard deviation in sensitivity of 0.82 inch. This compares quite favorably with a widely used mixture in which lead styphnate is used as the principal explosive which shows an average firing height of 7.04 inches and a standard deviation in sensitivity of 0.52 inch when tested under the same circumstances.

As a further example of the significant differences between these materials, it may be noted that when either monobasic lead picrate·lead nitrate or monobasic lead picrate·lead acetate is substituted for lead styphnate in a conventional rimfire mixture it is impossible to fire the mixture with any amount of energy which can be supplied in the conventional drop test. This should be contrasted with the behavior of the triple salt referred to above.

Table II$_A$ also shows the composition of exemplary rimfire priming mixtures using as principal explosive ingredients monobasic lead picrate·lead nitrate·lead hypophospite; dibasic lead picrate·lead nitrate·lead acetate; and monobasic lead picrate·lead nitrate·lead acetate·lead hypophosphite. In each case, the preferred mixture is about 46% of the new explosive, 4% tetracene and 50% barium nitrate. As is well known in the industry, tetracene is a sensitizer and when used in amounts as little as 2% has been recognized as resulting in improved uniformity of percussion sensitivity. Barium nitrate, of course, is a well known oxidizer which contributes to improved efficiency since the new explosives are not completely self-sufficient in oxygen.

Table II$_B$ is prepared in the same manner as Table II$_A$ and illustrates typical and preferred mixtures for shot shell and centerfire primers:

other than ammunition priming compositions, the following examples are noted:

Tribasic lead picrate·lead acetate·lead azide (Example 33) is useful as the explosive in a low cost, reliable, non-rupturing (or self-contained) mild detonating fuze;

Monobasic lead picrate·lead propionate·lead azide·lead azide (Example 43) are useful as pressed ignition (Example 42) and dibasic lead picrate·lead propionate charges in place of lead styphnate in fuse fired blasting caps; monobasic lead picrate·lead propionate·lead azide (Example 42) provides an exceptionally fast firing loose ignition charge in electric blasting caps and is therefore useful in seismograph electric blasting caps in place of lead styphnate. This explosive propagates an explosion at extremely low loading densities—0.07 gram/foot in mild detonating fuze.

Tribasic lead picrate·lead nitrate·lead acetate (Example 22) is faster firing and less sensitive to impact than conventional loose ignition mixes and its use should improve the safety of commercial electric blasting caps.

These explosives generally and mixtures containing them have outstanding safety characteristics, especially when wet as they are normally handled during manufacturing plant processing. For example, neither basic lead picrate·lead nitrate·lead acetate when wet with 25% water nor a wet priming mixture (10% to 13% water) could be set off with a No. 8 blasting cap nor could they be set off with a burning firecracker fuze running through them. A wet rimfire mixture would not fire with an 8 ounce weight dropped from 30 inches, and neither the wet nor dry explosive would fire when exposed to 6500 volts discharged from a 300 micro-microfarad capacitor. These characteristics of almost complete insensitivity to static electricity and the very low sensitivity when wet makes these explosives unusually safe to handle in normal factory operation.

TABLE II$_B$

SHOT SHELL AND CENTER FIRE PRIMING COMPOSITIONS

[Mean Firing Height (2 oz. wt.) 3″ to 8″]

| | Range | Typical | | | | | | | | Preferred |
|---|---|---|---|---|---|---|---|---|---|---|
| Monobasic Lead Picrate·Lead Nitrate·Lead Acetate | 38–50 | 48 | 42 | 38 | 50 | 44 | 38 | 42 | 43 | 48 | [1] 42 |
| Tetracene | 2–5 | 2 | 2 | 2 | 2 | 2 | 2 | 2 | 2 | 2 | 2 |
| Petn | 0–6 | | | | | | | | 6 | | |
| Barium Nitrate | 38–52 | 41 | 43½ | 43½ | 40 | 43½ | 43½ | 44 | 43 | 45 | 44 |
| Antimony Sulfide | 0–10 | 9 | 5½ | 9 | 9 | 6½ | 9 | 7 | 6 | | |
| Calcium Silicide | 0–10 | | 7 | 7½ | 4 | 4 | | | | | 7 |
| Aluminum—Chromated | 0–20 | | | | | | 7½ | 5 | | | 5 |
| Zirconium Hydride | 0–10 | | | | | | | | | 5 | |
| Monobasic Lead Picrate·Lead Nitrate·Lead Acetate·Lead Hypophosphite | | | 43 | | | | | | | | |
| Tetracene | | | 4 | | | | | | | | |
| Barium Nitrate | | | 43 | | | | | | | | |
| Antimony Sulfide | | | 5 | | | | | | | | |
| Calcium Silicide | | | 5 | | | | | | | | |

[1] PS 71.

Adhesive binders, emulsifiers and wetting agents may be added to any of these mixtures in accordance with common practice in the industry. For example, emulsifiers that aid in mixing in both rim fire and center fire wet mixes are esters of fatty acids condensed with polyoxyethylene. Specific examples are:

(1) An emulsifier known as "Tween" 40 which has been identified as polyoxyethylene sorbitan monopalmitate;
(2) An emulsifier known as "Tween" 85 which has been identified as polyoxyethylene sorbitan trioleate; and
(3) An emulsifier known as "Emulphor" El–719 which has been identified as polyoxyethylated vegetable oil.

These emulsifiers may be used in amounts from 1/10% to 25/100%. Adhesives that were used in rim fire mixtures are gum arabic, gelatin, polyvinyl alcohol and polyacrylamide. They are used in amounts from 25/100% to 50/100%.

In respect to the use of these explosives for purposes

What is claimed is:

1. A method of forming a complex salt of basic lead picrate, comprising the steps of
 (I) Dissolving and suspending in water a predetermined amount of picric acid;
 (II) Reacting with the solution and suspension of picric acid, slightly in excess of any multiple up to three of two gram moles of sodium hydroxide and slightly in excess of the same multiple of one gram mole of one or more monovalent sodium salts of monobasic acids selected from the group consisting of acetic acid, formic acid, propionic acid, hypophosphorous acid, glycolic acid, lactic acid, aminoacetic acid, acrylic acid, methacrylic acid, butyric acid, nitroaminoguanidine, chloric acid, and hydrazoic acid;
 (III) Adding, with heat and stirring, as a combining and precipitating agent, for each gram mole of picric acid, slightly in excess of the same multiple of three gram moles of a lead salt selected from the group of lead salts consisting of lead nitrate, lead acetate, lead lactate, lead acrylate, lead methacrylate, lead propionate, and lead formate;

(IV) Continuing the stirring until an insoluble complex salt is precipitated;

(V) Separating the complex salt by washing the precipitate.

2. A method of forming a complex salt of basic lead picrate, comprising the steps of (I) Dissolving and suspending in water a predetermined amount of picric acid;

(II) Reacting with the solution and suspension of picric acid slightly in excess of any multiple up to three of two gram moles of sodium hydroxide and slightly in excess of the same multiple of one gram mole of one or more monovalent sodium salts of monobasic acids selected from the group consisting of acetic acid, formic acid, propionic acid, hypophosphorous acid, glycolic acid, lactic acid, aminoacetic acid, acrylic acid, methacrylic acid, butyric acid, nitroaminoguanidine, chloric acid, and hydrazoic acid;

(III) Adding, with heat and stirring, as a combining and precipitating agent, for each gram mole of picric acid, slightly in excess of the same multiple of three gram moles of lead nitrate;

(IV) Continuing the stirring until an insoluble complex salt is precipitated;

(V) Separating the complex salt by washing the precipitate.

3. A complex inclusion salt combining in characteristic crystalline form definite proportions of basic lead picrate, at least one but not more than two of the lead salts selected from the group of lead salts of monobasic acids of no greater acid strength than picric acid consisting of lead acetate, lead hypophosphite, lead nitroaminoguanidine, lead chlorate, lead azide, lead formate, lead propionate, lead glycolate, lead lactate, lead aminoacetate, lead acrylate, lead methacrylate, and lead butyrate, and one combining and precipitating lead salt selected from the group of lead salts of monobasic acids consisting of lead nitrate, lead acetate, lead lactate, lead acrylate, lead methacrylate, lead propionate, and lead formate.

4. The tripple salt monobasic lead picrate·lead nitrate·lead acetate.

5. The tripple salt monobasic lead picrate·lead nitrate·lead hypophosphite.

6. The tripple salt monobasic lead picrate·lead nitrate·lead nitroaminoguanidine.

7. The triple salt monobasic lead picrate·lead nitrate·lead chlorate.

8. The triple salt monobasic lead picrate·lead nitrate·lead azide.

9. The triple salt monobasic lead picrate·lead nitrate·lead formate.

10. The tripple salt monobasic lead picrate·lead nitrate·lead propionate.

11. The triple salt monobasic lead picrate·lead nitrate·lead glycolate.

12. The triple salt monobasic lead picrate·lead nitrate·lead lactate.

13. The triple salt monobasic lead picrate·lead nitrate·lead amino acetate.

14. The triple salt monobasic lead picrate·lead nitrate·lead acrylate.

15. The triple salt monobasic lead picrate·lead nitrate·lead methacrylate.

16. The triple salt monobasic lead picrate·lead nitrate·lead butyrate.

17. The triple salt dibasic lead picrate·lead nitrate·lead acetate.

18. The triple salt dibasic lead picrate·lead nitrate·lead azide.

19. The triple salt dibasic lead picrate·lead nitrate·lead glycolate.

20. The triple salt dibasic lead picrate·lead nitrate·lead lactate.

21. The triple salt dibasic lead picrate·lead nitrate·lead amino acetate.

22. The triple salt dibasic lead picrate·lead nitrate·lead acrylate.

23. The triple salt dibasic lead picrate·lead nitrate·lead methacrylate.

24. The triple salt dibasic lead picrate·lead nitrate·lead butyrate.

25. The triple salt tribasic lead picrate·lead nitrate·lead acetate.

26. The triple salt tribasic lead picrate·lead nitrate·lead azide.

27. The triple salt tribasic lead picrate·lead nitrate·lead lactate.

28. The triple salt tribasic lead picrate·lead nitrate·lead acrylate.

29. The triple salt tribasic lead picrate·lead nitrate·lead methacrylate.

30. The quadruple salt monobasic lead picrate·lead nitrate·lead acetate·lead hypophosphite.

31. The quadruple salt monobasic lead picrate·lead nitrate·lead hypophosphite·lead azide.

32. The quadruple salt dibasic lead picrate·lead nitrate·lead acetate·lead hypophosphite.

33. The quadruple salt tribasic lead picrate·lead nitrate·lead acetate·lead hypophosphite.

34. The triple salt monobasic lead picrate·lead acetate·lead azide.

35. The triple salt dibasic lead picrate·lead acetate·lead azide.

36. The triple salt tribasic lead picrate·lead acetate·lead azide.

37. The triple salt monobasic lead picrate·lead lactate·lead azide.

38. The triple salt dibasic lead picrate·lead lactate·lead azide.

39. The triple salt tribasic lead picrate·lead lactate·lead azide.

40. The triple salt monobasic lead picrate·lead acrylate·lead azide.

41. The triple salt dibasic lead picrate·lead acrylate·lead azide.

42. The triple salt tribasic lead picrate·lead acrylate·lead azide.

43. The triple salt monobasic lead picrate·lead methacrylate·lead azide.

44. The triple salt dibasic lead picrate·lead methacrylate·lead azide.

45. The triple salt monobasic lead picrate·lead propionate·lead azide.

46. The triple salt dibasic lead picrate·lead propionate·lead azide.

47. The triple salt monobasic lead picrate·lead formate·lead azide.

48. A rimfire ammunition priming composition comprising in substantially the specified proportions the following ingredients:

| Ingredient | Percent |
|---|---|
| Monobasic lead picrate·lead nitrate·lead acetate | 36 to 50 |
| Tetracene | 2 to 5 |
| Potassium lead styphnate·lead hypophosphite | 0 to 10 |
| Normal lead styphnate | 0 to 10 |
| Oxidizer, which may be either or both barium or lead nitrate or a mixture of both nitrates | 25 to 58 |
| Barium nitrate | 0 to 58 |
| Lead nitrate | 0 to 50 |
| Basic lead nitrate | 0 to 10 |

| | Percent |
|---|---|
| Lead dioxide | 0 to 10 |
| Lead thiocyanate | 0 to 10 |
| Boron | 0 to 5 |
| Antimony sulfide | 0 to 5 |
| Glass | 0 to 33 |

49. A shotshell and centerfire ammunition priming composition comprising in substantially the specified proportions the following ingredients:

| | Percent |
|---|---|
| Monobasic lead picrate·lead nitrate·lead acetate | 38 to 50 |
| Tetracene | 2 to 5 |
| Barium nitrate | 38 to 52 |
| Petn | 0 to 6 |
| Antimony sulfide | 0 to 10 |
| Calcium silicide | 0 to 10 |
| Aluminum-chromated | 0 to 20 |
| Zirconium hydride | 0 to 10 |

50. A rimfire ammunition priming composition comprising in approximately the specified proportions the following ingredients:

| | Percent |
|---|---|
| Monobasic lead picrate·lead nitrate·lead acetate | 46 |
| Tetracene | 4 |
| Barium nitrate | 50 |

51. A rimfire ammunition priming composition comprising in approximately the specified proportions the following ingredients:

| | Percent |
|---|---|
| Monobasic lead picrate·lead nitrate·lead hypophosphite | 46 |
| Tetracene | 4 |
| Barium nitrate | 50 |

52. A rimfire ammunition priming composition comprising in approximately the specified proportions the following ingredients:

| | Percent |
|---|---|
| Dibasic lead picrate·lead nitrate·lead acetate | 46 |
| Tetracene | 4 |
| Barium nitrate | 50 |

53. A rimfire ammunition priming composition comprising in approximately the specified proportions the following ingredients:

| | Percent |
|---|---|
| Dibasic lead picrate·lead nitrate·lead acetate | 70 |
| Tetracene | 5 |
| Barium nitrate | 25 |

54. A rimfire ammunition priming composition comprising in approximately the specified proportions the following ingredients:

| | Percent |
|---|---|
| Monobasic lead picrate·lead nitrate·lead acetate·lead hypophosphite | 46 |
| Tetracene | 4 |
| Barium nitrate | 50 |

55. A rimfire ammunition priming composition comprising in approximately the specified proportions the following ingredients:

| | Percent |
|---|---|
| Monobasic lead picrate·lead nitrate·lead acetate·lead hypophosphite | 46 |
| Tetracene | 4 |
| Lead nitrate | 40 |
| Basic lead nitrate | 10 |

56. A shot shell and centerfire ammunition priming composition comprising in approximately the specified proportions the following ingredients:

| | Percent |
|---|---|
| Monobasic lead picrate·lead nitrate·lead acetate·lead | 42 |
| Tetracene | 2 |
| Barium nitrate | 44 |
| Calcium silicide | 7 |
| Aluminum-chromated | 5 |

57. A shot shell and centerfire ammunition priming composition comprising in approximately the specified proportions the following ingredients:

| | Percent |
|---|---|
| Monobasic lead picrate·lead nitrate·lead acetate·lead hypophosphite | 43 |
| Tetracene | 4 |
| Barium nitrate | 43 |
| Antimony sulfide | 5 |
| Calcium silicide | 5 |

References Cited by the Examiner

UNITED STATES PATENTS

| 2,226,391 | 12/1940 | Rubenstein | 260—435 |
| 2,295,104 | 9/1942 | Garfield | 260—435 |

FOREIGN PATENTS

| 679,064 | 7/1939 | Germany. |
| 192,830 | 2/1923 | Great Britain. |

BENJAMIN R. PADGETT, *Primary Examiner.*

L. A. SEBASTIAN, *Assistant Examiner.*